(12) United States Patent
Murata et al.

(10) Patent No.: US 11,060,991 B2
(45) Date of Patent: Jul. 13, 2021

(54) GAS ALARM DEVICE AND GAS DETECTION METHOD

(71) Applicants: FUJI ELECTRIC CO., LTD., Kanagawa (JP); Osaka Gas Co., Ltd., Osaka (JP)

(72) Inventors: Naoyoshi Murata, Hino (JP); Takuya Suzuki, Tubingen (DE); Makoto Okamura, Hachioji (JP); Tsuyoshi Kamioka, Nasushiobara (JP); Hisao Ohnishi, Osaka (JP); Atsushi Nonaka, Hyogo (JP)

(73) Assignees: FUJI ELECTRIC CO., LTD., Kanagawa (JP); Osaka Gas Co., Ltd., Osaka (JP)

( * ) Notice: Subject to any disclaimer, the term of this patent is extended or adjusted under 35 U.S.C. 154(b) by 356 days.

(21) Appl. No.: 16/253,086

(22) Filed: Jan. 21, 2019

(65) Prior Publication Data
US 2019/0154609 A1   May 23, 2019

Related U.S. Application Data

(63) Continuation of application No. PCT/JP2018/003701, filed on Feb. 2, 2018.

(30) Foreign Application Priority Data

Feb. 3, 2017   (JP) .............................. JP2017-018855

(51) Int. Cl.
*G01N 27/00* (2006.01)
*G01N 27/12* (2006.01)
(Continued)

(52) U.S. Cl.
CPC ........... *G01N 27/124* (2013.01); *G08B 17/10* (2013.01); *G08B 17/117* (2013.01); *G08B 21/16* (2013.01)

(58) Field of Classification Search
CPC .... G01N 27/124; G08B 17/117; G08B 21/16; G08B 17/10
See application file for complete search history.

(56) References Cited

U.S. PATENT DOCUMENTS

| | | | |
|---|---|---|---|
| 4,399,684 A | * | 8/1983 | Advani ................ G01N 27/124 73/1.07 |
| 5,036,820 A | * | 8/1991 | Fujimoto ............... F02D 41/148 123/686 |

(Continued)

FOREIGN PATENT DOCUMENTS

| | | |
|---|---|---|
| JP | H10283583 A | 10/1998 |
| JP | 2002257766 A | 9/2002 |

(Continued)

OTHER PUBLICATIONS

International Search Report for International Patent Application No. PCT/JP2018/003701, issued by the Japan Patent Office dated Feb. 27, 2018.

*Primary Examiner* — Ojiako K Nwugo

(57) ABSTRACT

A gas alarm device is provided, where a heating control section extends a heating period of time of a heater section if a first determination section determines that electrical characteristics of a sensing section of a gas sensor satisfy a first condition, and continues extension of the heating period of time of the heater section according to a determination result, by a second determination section, of whether or not the electrical characteristics upon lapse of extension of the heating period of time satisfy a second condition, and a gas detection section determines, according to the electrical characteristics upon lapse of extension time, that detection target gas is detected.

15 Claims, 15 Drawing Sheets

(51) Int. Cl.
*G08B 17/10* (2006.01)
*G08B 17/117* (2006.01)
*G08B 21/16* (2006.01)

(56) References Cited

U.S. PATENT DOCUMENTS

| | | | | |
|---|---|---|---|---|
| 5,759,368 A * | 6/1998 | Kuhn | ................. | G01N 27/4045 |
| | | | | 204/403.01 |
| 6,131,438 A * | 10/2000 | Zanini-Fisher | ........ | G01N 27/16 |
| | | | | 204/427 |
| 6,336,354 B1 * | 1/2002 | Suzuki | ............... | G01N 27/4067 |
| | | | | 338/34 |
| 7,872,480 B2 * | 1/2011 | Kato | ................. | G01N 27/4067 |
| | | | | 324/691 |
| 2002/0000436 A1 * | 1/2002 | Hashimoto | .......... | G01N 27/122 |
| | | | | 219/497 |
| 2002/0142478 A1 * | 10/2002 | Wado | ................. | G01N 27/124 |
| | | | | 436/151 |
| 2005/0016849 A1 * | 1/2005 | Ikoma | ............ | G01N 27/4077 |
| | | | | 204/429 |
| 2005/0109619 A1 * | 5/2005 | Yosiyasu | ............ | G01N 27/4071 |
| | | | | 204/424 |
| 2009/0051373 A1 * | 2/2009 | Kato | ................. | G01N 27/4067 |
| | | | | 324/693 |
| 2010/0133116 A1 * | 6/2010 | Ieda | ................. | G01N 33/0037 |
| | | | | 205/775 |
| 2011/0036716 A1 * | 2/2011 | Sekiya | ............... | G01N 27/4077 |
| | | | | 204/424 |
| 2012/0131909 A1 * | 5/2012 | Maeda | ............... | G01N 27/4175 |
| | | | | 60/276 |
| 2012/0217550 A1 * | 8/2012 | Usagawa | ........... | G01N 27/4141 |
| | | | | 257/253 |
| 2015/0285772 A1 * | 10/2015 | Park | ................... | G01N 33/0031 |
| | | | | 73/31.05 |
| 2016/0054256 A1 * | 2/2016 | Sakuma | ............. | G01N 27/4071 |
| | | | | 204/408 |
| 2016/0097737 A1 * | 4/2016 | Higuchi | ............. | G01N 27/4175 |
| | | | | 204/401 |
| 2016/0216227 A1 * | 7/2016 | Boni | .................... | G01N 33/004 |
| 2019/0302046 A1 * | 10/2019 | Yoshioka | ............. | G01N 27/124 |

FOREIGN PATENT DOCUMENTS

| | | |
|---|---|---|
| JP | 2009210344 A | 9/2009 |
| JP | 2012195017 A | 10/2012 |

* cited by examiner

GAS ALARM DEVICE AND GAS DETECTION METHOD

The contents of the following Japanese patent application(s) are incorporated herein by reference:
NO. 2017-018855 filed in JP on Feb. 3, 2017, and
NO. PCT/JP2018/003701 filed on Feb. 2, 2018.

BACKGROUND

Technical Field

The present invention relates to a gas alarm device and a gas detection method.

Related Art

A gas alarm device that pulse-drives a heater layer when detecting gas has been known. A gas detection device that extends a heating period of time when detecting gas having slow output response characteristics, such as methane gas, to continue detecting a gas concentration has been known (for example, see Patent Document 1).

PRIOR ART LITERATURE

Patent Document

[Patent Document 1] Japanese Patent Application Publication No. Hei 10-283583

SUMMARY

Electrical characteristics of a sensor may change when gas other than detection target gas is present even if the detection target gas is not present. When the heating period of time is extended long to easily determine whether or not the present gas is the detection target gas, power consumption becomes high.

It is desirable that in a gas alarm device the power consumption can be reduced while the detection target gas can be distinguished from non-detection target gas and detected.

In a first aspect of the present invention, a gas alarm device is provided. The gas alarm device may include a gas sensor. The gas sensor may include a sensing section and a heater section. Electrical characteristics of the sensing section may change by a contact with detection target gas. The heater section may heat the sensing section. The gas alarm device may include a gas detection section. The gas detection section may detect the detection target gas based on the electrical characteristics of the sensing section. The gas alarm device may include a heating control section. The heating control section may control the heating by the heater section. The gas alarm device may include a first determination section. The first determination section may determine whether or not the electrical characteristics of the sensing section satisfy a first condition. The gas alarm device may include a second determination section. The second determination section may determine whether or not the electrical characteristics of the sensing section satisfy a second condition. The heating control section may extend a heating period of time of the heater section if the first determination section determines that the electrical characteristics satisfy the first condition. If the first determination section determines that the electrical characteristics satisfy a heating extension starting condition, the heating control section may continue extending the heating period of time of the heater section in accordance with a determination result, by the second determination section, of whether or not the electrical characteristics upon lapse of the extension of the heating period of time satisfy the second condition. According to the electrical characteristics at the extension time, the gas detection section may determine that the detection target gas is detected.

The first condition may be the heating extension starting condition. The second condition may be a heating stopping condition. The first determination section may determine whether or not the electrical characteristics of the sensing section satisfy the heating extension starting condition. The second determination section may determine whether or not the electrical characteristics of the sensing section satisfy the heating stopping condition. The heating control section may extend the heating period of time of the heater section if the first determination section determines that the electrical characteristics satisfy the heating extension starting condition. If the first determination section determines that the electrical characteristics satisfy the heating extension starting condition, the heating control section may continue extending the heating period of time until the second determination section determines that the electrical characteristics upon lapse of the extension of the heating period of time satisfy the heating stopping condition. If the second determination section determines that the electrical characteristics upon lapse of predetermined extension time do not satisfy the heating stopping condition, the gas detection section may determine that the detection target gas is detected.

The first condition may be the heating extension starting condition. The second condition may be a heating repeating condition. The first determination section may determine whether or not the electrical characteristics of the sensing section satisfy the heating extension starting condition. The second determination section may determine whether or not the electrical characteristics of the sensing section satisfy the heating repeating condition. The heating control section may extend the heating period of time of the heater section if the first determination section determines that the electrical characteristics satisfy the heating extension starting condition. If the first determination section determines that the electrical characteristics satisfy the heating extension starting condition, the heating control section may repeat the extension of the heating period of time and make the second determination section repeat the determination as long as the second determination section determines that the electrical characteristics upon lapse of the extension of the heating period of time satisfy the heating repeating condition. If the second determination section determines that the electrical characteristics upon lapse of the extension of the heating period of time satisfy the heating repeating condition, the gas detection section may determine that the detection target gas is detected.

The heating control section may repeat the extension of the heating period of time and make the second determination section repeat the determination with a predetermined number of times as an upper limit as long as the second determination section determines that the electrical characteristics upon lapse of the extension of the heating period of time satisfy the heating repeating condition. The heating control section may repeat the extension of the heating period of time and make the second determination section repeat the determination with a predetermined drive time as an upper limit as long as the second determination section determines that the electrical characteristics upon lapse of the extension of the heating period of time satisfy the heating repeating condition.

A temperature of the heater section may change depending on an applied voltage. The determination by the first determination section and the determination by the second determination section may be performed in a state in which the same voltage is applied to the heater section.

The heating extension starting condition and the heating repeating condition may be the same condition. The electrical characteristics of the sensing section may be an electrical resistance value of the sensing section. The heating control section may extend the heating period of time of the heater section if the first determination section determines that the electrical resistance value is equal to or less than a threshold value. If the first determination section determines that the electrical resistance value is equal to or less than the threshold value, the heating control section may repeat the extension of the heating period of time and make the second determination section repeat the determination with the predetermined number of times or the predetermined drive time as the upper limit as long as the second determination section determines that the electrical resistance value upon lapse of the extension of the heating period of time is equal to or less than the threshold value. Even after the extension of the heating period of time has been repeatedly performed for the upper-limit number of times or the upper-limit drive time, if the second determination section determines that the electrical resistance value upon lapse of the extension of the heating period of time is equal to or less than the threshold value, the gas detection section may determine that the detection target gas is detected.

The heating control section may stop the heating by the heater section if the second determination section determines that the electrical resistance value upon lapse of the extension of the heating period of time exceeds the threshold value.

The gas alarm device may further include a threshold value setting section. The threshold value setting section may set a threshold value according to a change rate of the electrical characteristics of the sensing section after the heater section starts to heat the sensing section or according to the electrical characteristics of the sensing section at two or more time points.

The heating extension starting condition and the heating repeating condition may be different conditions. The heating control section may extend the heating period of time of the heater section if the first determination section determines that the electrical resistance value is equal to or less than the first threshold value. If the first determination section determines that the electrical resistance value is equal to or less than the first threshold value, the heating control section may repeat the extension of the heating period of time and make the second determination section repeat the determination with the predetermined number of times or the predetermined drive time as the upper limit as long as the second determination section determines that the electrical resistance value upon lapse of the extension of the heating period of time is equal to or less than a second threshold value that is lower than the first threshold value. Even after the extension of the heating period of time has been repeatedly performed for the upper-limit number of times or the upper-limit drive time, if the second determination section determines that the electrical resistance value upon lapse of the extension of the heating period of time is equal to or less than the second threshold value, the gas detection section may determine that the detection target gas is detected.

The heating control section may extend the heating period of time of the heater section if the first determination section determines that the electrical resistance value is equal to or less than the first threshold value. The heating control section may stop heating by the heater section if the second determination section determines that the electrical resistance value upon lapse of the extension of the heating period of time exceeds the second threshold value that is lower than the first threshold value. Whether or not the electrical resistance value exceeds the second threshold value may be immediately estimated. The electrical resistance value of the sensing section may be extracted in a time cycle, which is shorter if compared to a set heating extension time, to be compared with the second threshold value. If it is determined that the electrical resistance value exceeds the second threshold value, the heating by the heater section may be instantly stopped even in the middle of the extension of the heating period of time.

The gas alarm device may further include a threshold value setting section. The threshold value setting section may set at least one of the first threshold value and the second threshold value according to the change rate of the electrical characteristics of the sensing section after the heater section starts to heat the sensing section. The threshold value setting section may set at least one of the first threshold value and the second threshold value according to the electrical characteristics of the sensing section at two or more time points.

The gas alarm device may further include an extension time setting section. The extension time setting section may set an extension time by which the heating period of time is extended according to the change rate of the electrical characteristics of the sensing section after the heater section starts to heat the sensing section. The extension time setting section may set an extension time by which the heating period of time is extended according to the electrical characteristics of the sensing section at two or more time points. The second threshold value may be changed depending on a number of extension times of heating. If a difference between the electrical resistance value upon lapse of the extension of the heating period of time and the second threshold value is smaller than a predetermined value, the heating extension time may be set to be shorter than an immediately previous heating extension time.

The heating control section may extend the heating period of time of the heater section if the first determination section determines that the electrical resistance value is equal to or less than the first threshold value. If the first determination section determines that the electrical resistance value is equal to or less than the first threshold value, the heating control section may continue extending the heating period of time with a predetermined number of extension times or a predetermined drive time as the upper limit as long as the second determination section determines that the electrical resistance values at two consecutive time points after lapse of the extension of the heating period of time show an increase tendency. Particularly, the heating control section may repeat the extension of the heating period of time and make the second determination section repeat the determination with a predetermined number of extension times or a predetermined drive time as an upper limit as long as it is determined that the electrical resistance values at two consecutive time points after lapse of the extension of the heating period of time show the increase tendency. Even after the extension of the heating period of time has been continued for the upper-limit number of extension times or the upper-limit drive time, if the second determination section determines that the electrical resistance values at two consecutive time points after lapse of the extension of the heating period of time show the increase tendency, the second determination section may further determine whether the last obtained electrical resistance value upon lapse of the extension of the heating period of time is equal to or less than the second threshold value. If it is determined that the last obtained electrical resistance value is equal to or less than the second threshold value, the gas detection section may determine that the detection target gas is detected. The second threshold value may be lower than the first threshold value.

The heating control section may extend the heating period of time of the heater section if it is determined that the change rate of the electrical characteristics of the sensing section after the heater section starts to heat the sensing section satisfies a predetermined relation. The heating control section may extend the heating period of time of the heater section if it is determined that the electrical characteristics of the sensing section obtained at two or more time points after the heater section starts to heat the sensing section satisfy the predetermined relation. If it is determined that the change rate of the electrical characteristics of the sensing section after the heater section starts to heat the sensing section satisfies the predetermined relation, or the electrical characteristics obtained at two or more time point satisfy the predetermined relation, the heating control section may continue extending the heating period of time with a predetermined number of extension times or a predetermined drive time as an upper limit as long as the second determination section determines that the electrical characteristics upon lapse of the extension of the heating period of time satisfy the second condition. If it is determined that the change rate of the electrical characteristics of the sensing section after the heater section starts to heat the sensing section satisfies the predetermined relation, or the electrical characteristics obtained at two or more time points satisfy the predetermined relation, the heating control section may repeat the extension of the heating period of time and make the second determination section repeat the determination with a predetermined number of extension times or a predetermined drive time as an upper limit as long as the second determination section determines that the electrical characteristics upon lapse of the extension of the heating period of time satisfy the second condition.

In a second aspect of the present invention, a gas detection method using a gas alarm device including a gas sensor is provided. The gas sensor may include a sensing section. Electrical characteristics of the sensing section may change by a contact with detection target gas. The gas sensor may include a heater section. The heater section may heat the sensing section. If it is determined that the electrical characteristics satisfy a heating extension starting condition, the heating period of time of the heater section may be extended. If it is determined that the electrical characteristics satisfy the heating extension starting condition as long as the electrical characteristics upon lapse of the extension of the heating period of time satisfy a heating repeating condition, the extension of the heating period of time and a determination whether or not the electrical characteristics upon lapse of the extension of the heating period of time satisfy the heating repeating condition may be repeatedly performed. If it is determined that the electrical characteristics upon lapse of the extension of the heating period of time satisfy the heating repeating condition, it may be determined that the detection target gas is detected.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
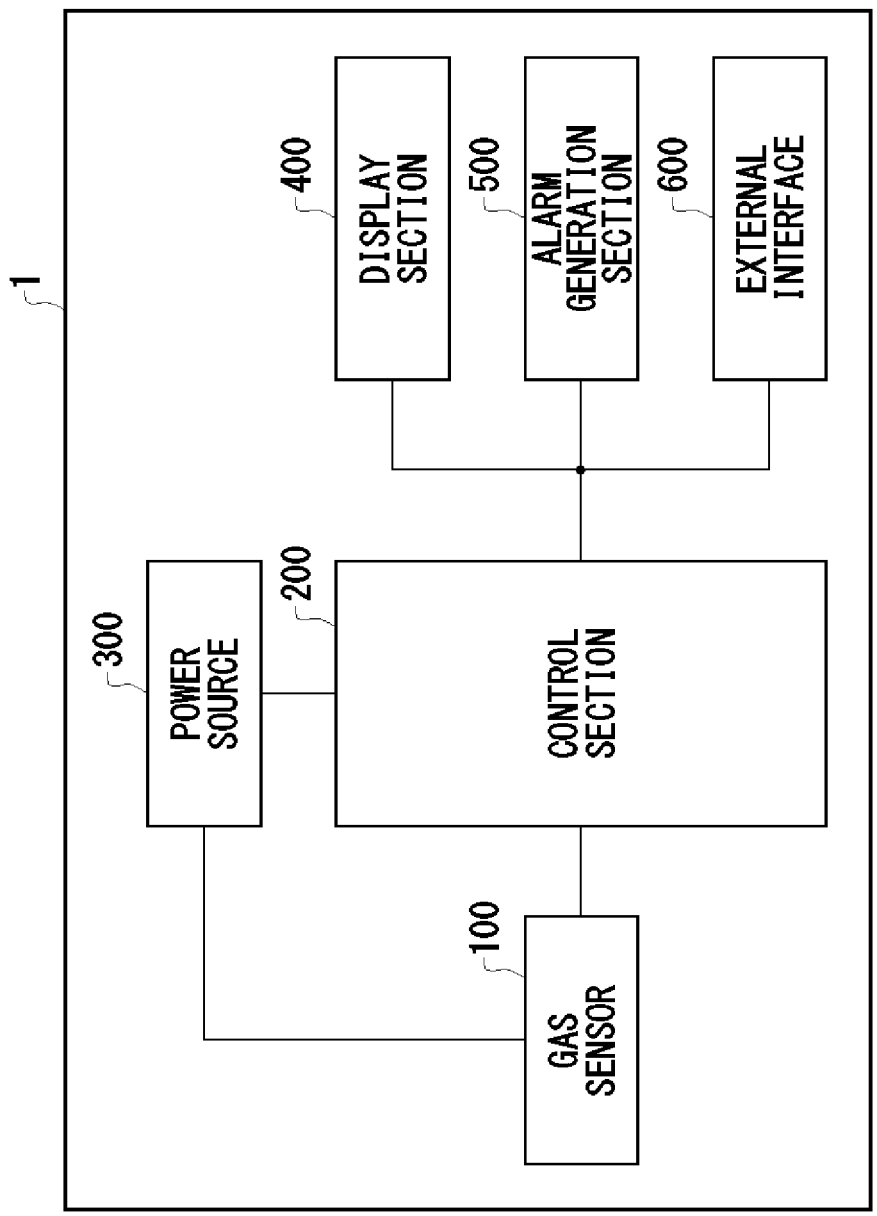
FIG. 1 shows a schematic diagram of a gas alarm device 1 of a first embodiment of the present invention.

FIG. 1 shows a schematic diagram of a gas alarm device 1 of a first embodiment of the present invention. The gas alarm device 1 of the present example issues an alarm if detection target gas is detected. The detection target gas may be combustible gas. The detection target gas may be city gas containing methane as a main component, and may also be LP gas containing propane and butane as main components. Also, the gas alarm device 1 may also be equipped with a CO (carbon monoxide) detection function. In this case, CO is also included in the detection target gas.

The gas alarm device 1 includes a gas sensor 100, a control section 200, a power source 300, a display section 400, an alarm generation section 500 and an external interface 600. The gas sensor 100 detects the presence/absence of the detection target gas. The gas sensor 100 detects the detection target gas in an atmosphere in which the gas alarm device 1 is installed. Even if gas (non-detection target gas) other than the detection target gas is present, the gas alarm device 1 of the present example prevents the heating period of time from being extended more than necessary to reduce power consumption by appropriately changing a number of times of extending the heating period of time of the sensor, or an extension time by which the heating period of time of the sensor is extended.

The control section 200 may be a microcomputer. The control section 200 may include a CPU and a peripheral circuit. The control section 200 is connected to the gas sensor 100, the display section 400, the alarm generation section 500 and the external interface 600, and controls each of these sections.

The power source 300 is connected to the gas sensor 100 and the control section 200. The power source 300 supplies electric power to the gas sensor 100 and the control section 200. The power source 300 is, for example, a battery. The battery may be a primary battery or a secondary battery. However, the power source 300 is not limited to the battery, and may also be configured with a commercial power source, such as AC 100V, and a constant voltage circuit.

The display section 400 is connected to the control section 200. If the detection target gas is detected by the gas sensor 100, the display section 400 displays information of a detection result. In the information of the detection result, a type and a concentration of the detection target gas may be included. The alarm generation section 500 is connected to the control section 200. If the detection target gas is detected by the gas sensor 100, the alarm generation section 500 issues an alarm sound. The alarm generation section 500 may also issue the alarm sound if an abnormality of the gas alarm device 1 is detected.

The external interface 600 is connected to the control section 200. The external interface 600 outputs an electrical signal of a predetermined voltage or the like to the outside if the detection target gas is detected by the gas sensor 100.

Figure 2:
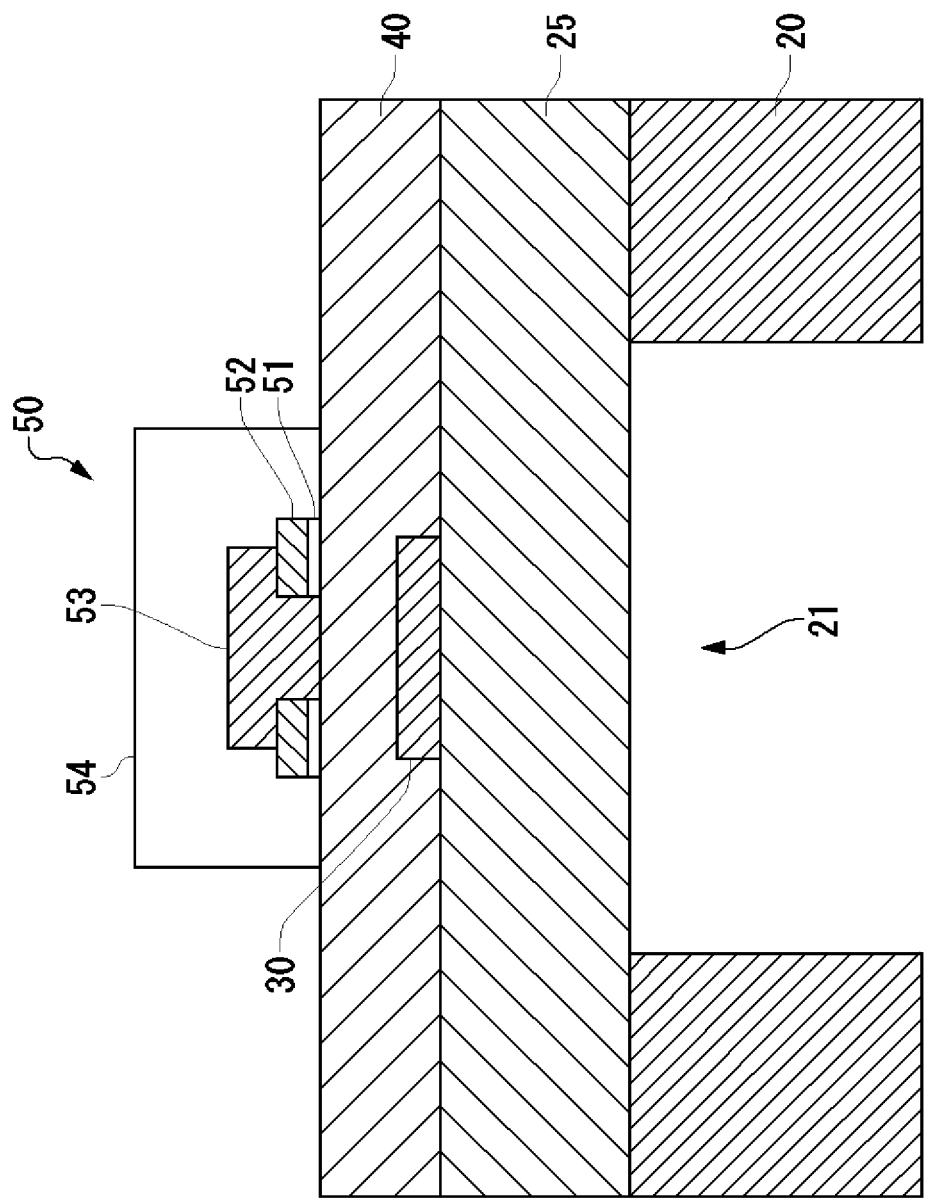
FIG. 2 shows a cross-sectional view of a schematic configuration of the gas sensor 100.

FIG. 2 is a cross-sectional view showing a schematic configuration of the gas sensor 100. The gas sensor 100 of the present example is a thin-film microsensor. The gas sensor 100 of the present example includes a silicon substrate 20, a thermal insulating support layer 25, a heater layer 30 that serves as a heater section, an electrical insulating layer 40 and a gas sensing layer 50. The silicon substrate 20 is provided with a through hole 21. The gas sensing layer 50 includes a joining layer 51, a gas sensing layer electrode 52, a sensing section 53 and a selective combustion layer 54.

The sensing section 53 is formed as a sensor resistor containing metal oxide, such as $SnO_2$, $In_2O_3$, $WO_3$, ZnO and $TiO_2$, for example, as a main component. Electrical characteristics of the sensing section 53 change by a contact with the detection target gas. Specifically, when the sensing section 53 comes into contact with the detection target gas, an electrical resistance value as the electrical characteristics of the sensing section 53 accordingly changes. The heater layer 30 heats the sensing section 53. The detection target gas is detected by using the electrical resistance value of the sensing section 53 when heating the sensing section 53 by the heater layer 30.

The selective combustion layer 54 is a sintered compact carrying at least one type of catalyst such as Pd, PdO and Pt, for example. In one example, the selective combustion layer 54 is a catalyst-carried $Al_2O_3$ sintered compact, and may also be formed of metal oxide, such as $Cr_2O_3$, $Fe_2O_3$, $Ni_2O_3$, $ZrO_2$, $SiO_2$ and zeolite, as main components. The silicon substrate 20 is configured with a silicon wafer.

In an atmosphere of an installation environment of the gas sensor 100 such as a methane ($CH_4$) sensor, the detection target gas and non-detection target gas may be present. As the non-detection target gas, gas types, such as oxygen, nitrogen, carbonic acid gas, water vapor and hydrocarbon-based gas having a low boiling point, may coexist. In the non-detection target gas, deterioration causing gas and interference gas are included. The deterioration causing gas is a gas type that causes characteristics deterioration to the gas sensor 100. The interference gas is a gas type that causes the electrical resistance value of the sensing section 53 of the gas sensor 100 to vary, and induces a false detection as if the detection target gas is present.

The selective combustion layer 54 reduces an influence on an output of the gas sensor 100 by selectively combusting the hydrocarbon-based gas having a low boiling point, for example, a volatile organic compound (VOC) such as alcohol. Also, a gas inlet to the gas sensor 100 is provided with an activated carbon adsorption layer to absorb and remove the deterioration causing gas. However, according to the installation environment of the gas sensor 100, the interference gas and the deterioration causing gas may not be completely removed. For example, the following state may occur: the hydrocarbon-based gas having a low boiling point absorbed in the activated carbon adsorption layer is desorbed and re-released in accordance with a lapse of time from the absorption and a change in the surrounding environment, and the re-released hydrocarbon-based gas is present in a high concentration within a package of the gas sensor 100.

The gas alarm device 1 of the present example performs control so that the power consumption can be reduced while the detection target gas can be distinguished from gas other than the detection target gas and be detected even if the electrical resistance value of the sensing section 53 is affected by the non-detection target gas that cannot be completely removed by the selective combustion layer 54.

Figure 3:
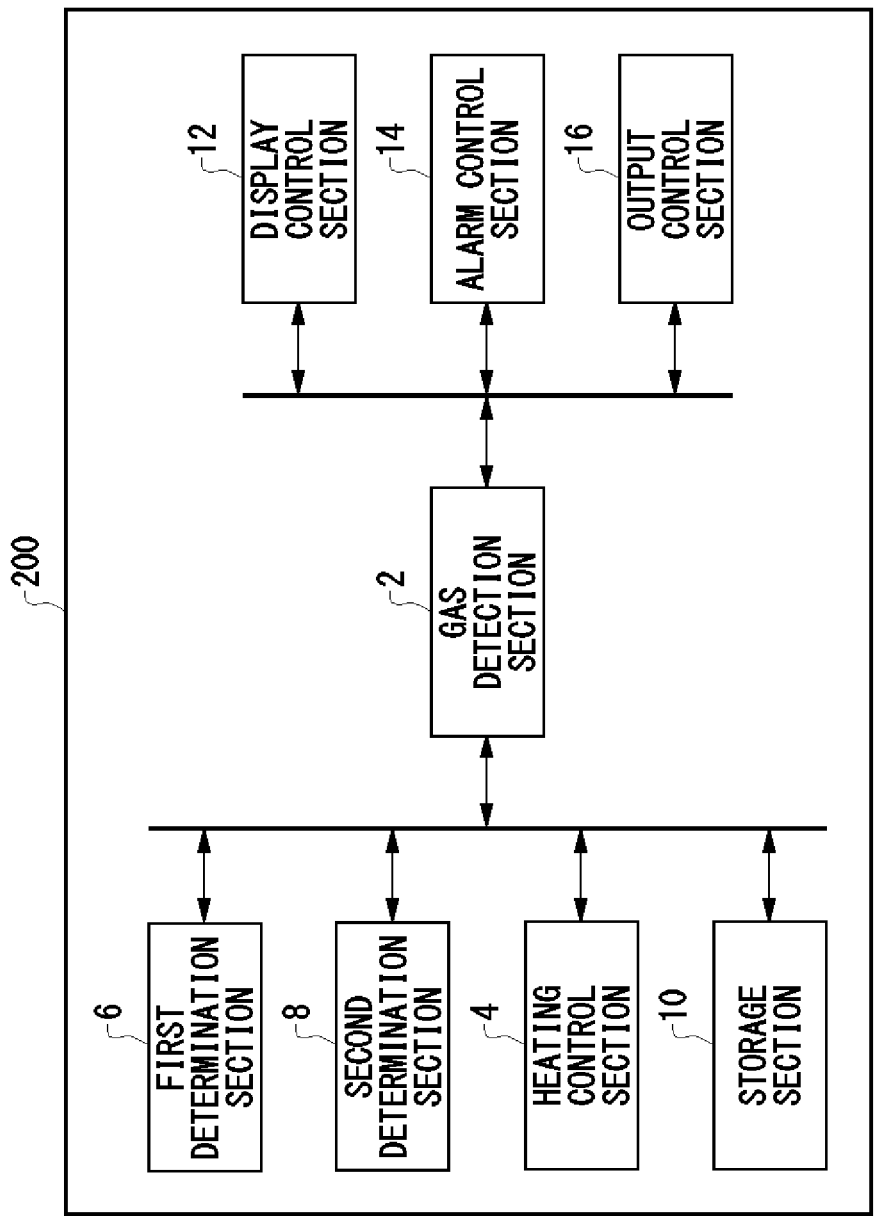
FIG. 3 shows a schematic diagram of a control section 200.

FIG. 3 shows a schematic diagram of a control section 200. The control section 200 includes a gas detection section 2, a heating control section 4, a first determination section 6, a second determination section 8 and a storage section 10. Therefore, the gas alarm device 1 of the present example includes each of these sections. The control section 200 may include a display control section 12, an alarm control section 14 and an output control section 16. The display control section 12 controls so that the display section 400 displays a detection result based on a signal input from the gas detection section 2. The alarm control section 14 controls the alarm generation section 500 to issue an alarm sound based on the signal input from the gas detection section 2. The output control section 16 controls the external interface 600 to output an electrical signal of a voltage or the like that is according to the detection contents based on the signal input from the gas detection section 2. Functions of the respective sections of the control section 200 may be achieved by a microcomputer and a storage element.

The gas detection section 2 detects the detection target gas based on the electrical characteristics of the sensing section 53 of the gas sensor 100. The gas detection section 2 may detect the detection target gas based on an electrical resistance value as the electrical characteristics of the sensing section 53. The heating control section 4 controls the heating by the heater layer 30. The first determination section 6 determines whether or not the electrical characteristics of the sensing section 53 satisfy the first condition. The first condition may be a heating extension starting condition. The first determination section 6 may determine whether or not the electrical characteristics of the sensing section 53 satisfy the heating extension starting condition. The second determination section 8 may determine whether or not the electrical characteristics of the sensing section 53 satisfy the second condition. The second condition is, for example, the heating repeating condition. The second determination section 8 may determine whether or not the heating repeating condition is satisfied. The storage section 10 may store the heating extension starting condition and the heating repeating condition used for various determinations. For example, the storage section 10 stores a threshold value used for various determinations. Also, the storage section 10 may also store a history that is at a time when the gas alarm device 1 issues an alarm as history data. The storage section 10 may also store history of the extension of the heating period of time as extension history data of the heating period of time.

In the gas sensor 100 of the present example, the heater layer 30 is pulse-driven in a predetermined cycle T only when the gas is detected. That is, the heating control section 4 applies the voltage to the heater layer 30 during a fixed pulse width time. In the gas sensor 100 of the present example, the heating control section 4 pulse-drives the heater layer 30 with a pulse width that is equal to or greater than 50 milliseconds and equal to or less than 500 milliseconds and causes a temperature of the heater layer 30 to rise to a temperature of equal to or greater than 400° C. and equal to or less than 500° C. in a cycle T that is equal to or greater than 30 seconds and equal to or less than 60 seconds.

The heating control section 4 extends the heating period of time of the heater layer 30 if the first determination section 6 determines that the electrical characteristics of the sensing section 53 satisfy the heating extension starting condition. As shown in the present example, in a case of the intermittent drive type gas alarm device 1 that pulse-drives the heater layer 30 only when the gas is detected and suspends the heater layer 30 during the rest of the time, a drive time during which the heater layer 30 is pulse-driven is the heating period of time. Then, the heating control section 4 may extend the heating period of time of the heater layer 30 if the first determination section 6 determines that the electrical characteristics of the sensing section 53 satisfy the heating extension starting condition. The heating control section 4 may continue extending the heating period of time of the heater layer 30 in accordance with a determination result, by the second determination section 8, of whether or not the electrical characteristics of the sensing section 53 upon lapse of the extension of the heating period of time satisfy the second condition. The gas detection section 2 may determine that the detection target gas is detected according to the electrical characteristics of the sensing section 53 upon lapse of the extension time. In the present example, the heating control section 4 repeats the extension of the heating period of time and makes the second determination section 8 repeat the determination as long as the second determination section 8 determines that the electrical characteristics satisfy the heating repeating condition. The heating control section 4 may repeat the extension of the heating period of time and make the second determination section 8 repeat the determination with a predetermined number of times or a predetermined drive time as an upper limit as long as the second determination section 8 determines that the electrical characteristics satisfy the heating repeating condition.

Even after the extension of the heating period of time has been repeatedly performed for the upper-limit number of times or the upper-limit drive time, if the second determination section 8 determines that the electrical characteristics satisfy the heating repeating condition, the gas detection section 2 determines that the detection target gas is detected. In the present example, the heating extension starting condition and the heating repeating condition are different conditions. In the present example, as the heating extension starting condition, it is determined that the electrical resistance value of the sensing section 53 is equal to or less than a first threshold value. On the other hand, as the heating repeating condition, it is determined that the electrical resistance value of the sensing section 53 is equal to or less than a second threshold value that is lower than the first threshold value. The second threshold value may be a value corresponding to a lower limit of a gas alarm concentration of methane or the like being the detection target. The second threshold value may be an alarm determination threshold value for determining whether or not to issue an alarm. The first threshold value may be set to a resistance value that is higher than the alarm determination threshold value.

Note that if the electrical resistance value of the sensing section 53 exceeds the second threshold value, the heating control section 4 may also assume that the heating stopping condition is satisfied and control to stop heating. The heating stopping condition may be one example of the second condition. In this case, the second determination section 8 determines whether or not the electrical characteristics of the sensing section 53 satisfy the heating stopping condition. The storage section 10 may store the heating stopping condition that is used for various determinations. The heating control section 4 extends the heating period of time of the heater layer 30 if the first determination section 6 determines that the electrical characteristics of the sensing section 53 satisfy the heating extension starting condition.

Then, if the first determination section 6 determines that the electrical characteristics of the sensing section 53 satisfy the heating extension starting condition, the heating control section 4 may continue extending the heating period of time until the second determination section 8 determines that the electrical characteristics upon lapse of the extension of the heating period of time satisfy the heating stopping condition. If it is determined that the electrical characteristics upon lapse of the predetermined extension time do not satisfy the heating stopping condition, the gas detection section 2 may determine that the detection target gas is detected.

As the heating stopping condition, it may be determined that the electrical resistance value of the sensing section 53 exceeds the second threshold value. In this case, the heating control section 4 extends the heating period of time of the heater layer 30 if the first determination section 6 determines that the electrical resistance value is equal to or less than the first threshold value and continues extending the heating period of time until the second determination section 8 determines that the electrical resistance value upon lapse of the extension of the heating period of time exceeds the second threshold value. If it is determined that the electrical resistance value of the sensing section 53 upon lapse of the predetermined extension time does not exceed the second threshold value, the gas detection section 2 may determine that the detection target gas is detected.

The control section 200 may measure and determine in real time whether or not the heating stopping condition is satisfied. Whether or not the electrical resistance value of the sensing section 53 exceeds the second threshold value may be immediately measured. Here, the real-time measurement includes a case in which the electrical resistance value of the sensing section 53 is extracted in a time cycle that is shorter if compared to the set heating extension time. As one example, the control section 200 may extract the electrical resistance value of the sensing section 53 for the shortest sampling time determined according to a specification of a microcomputer, and compare the electrical resistance value to the second threshold value. Instead of this, the second determination section 8 may also use a comparator for the comparison between the electrical resistance value of the sensing section 53 and the second threshold value. In this case, the comparator compares a current value or a voltage value corresponding to the electrical resistance value with a current value or a voltage value corresponding to the second threshold value. The comparator switches an output signal when the electrical resistance value of the sensing section 53 exceeds the second threshold value.

According to such a configuration, if the heating stopping condition is satisfied, the heating is instantly interrupted even in the middle of extending the heating period of time once the heating extension time is recognized. If the electrical resistance value of the sensing section 53 exceeds the second threshold value, because it can be determined that the detection target gas is not present, it is no longer necessary to continue the heating. Therefore, by instantly stopping the heating, power saving can be achieved.

Figure 4:
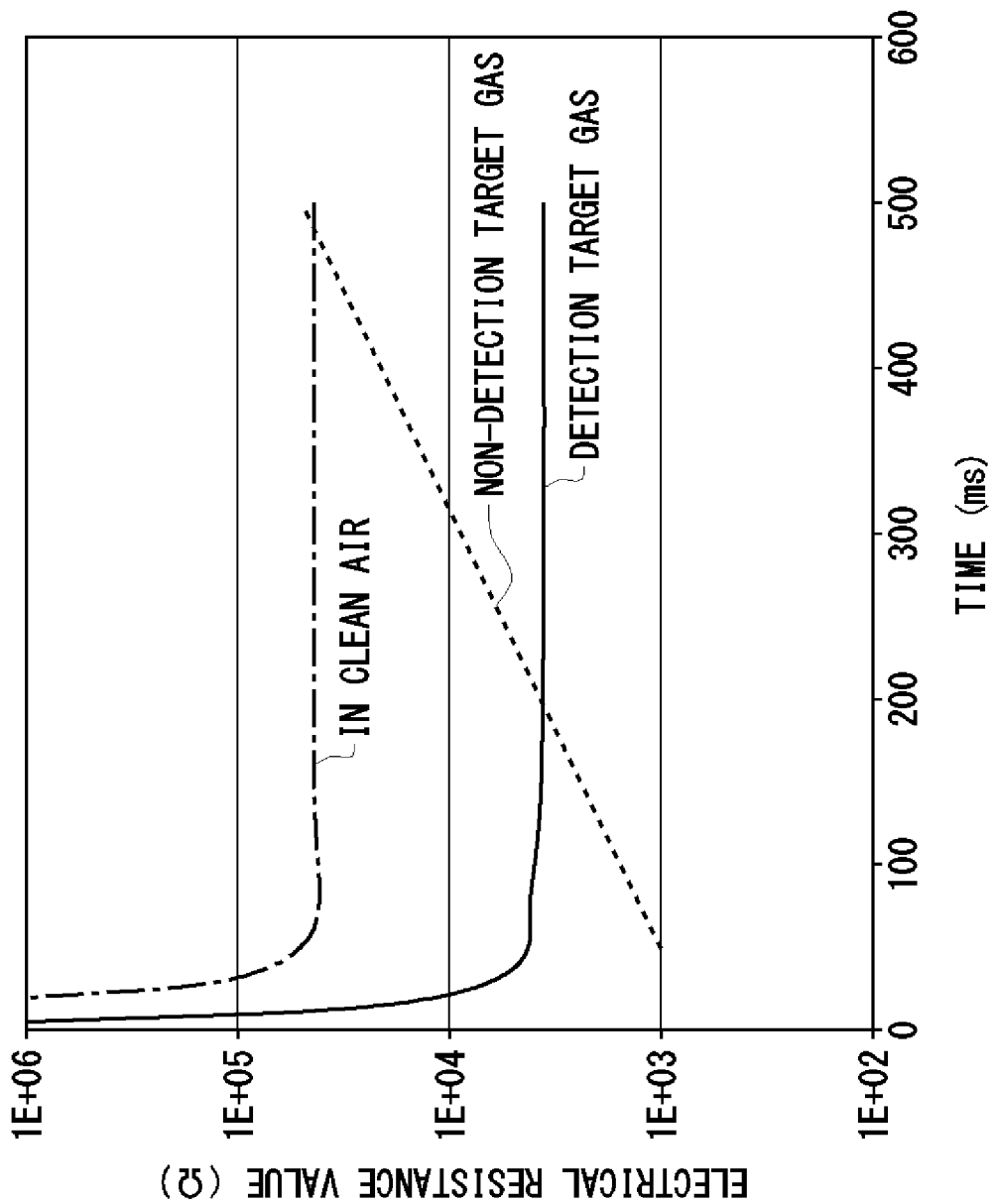
FIG. 4 shows relations respectively between a heating period of time of a heater and an electrical resistance value of a sensor in various atmospheres.

FIG. 4 is a drawing showing relations respectively between a heating period of time of a heater and an electrical resistance value of a sensor in various atmospheres. Specifically, FIG. 4 shows a change of the electrical resistance value of the sensing section 53 if heating the sensing section 53 by driving the heater layer 30 with a pulse width of 500 milliseconds. In FIG. 4, the detection target gas is methane and the non-detection target gas is alcohol. In one example, the sensing section 53 may be heated at a temperature that is equal to or greater than 350° C. and equal to or less than 450° C., and particularly, the sensing section 53 may be heated at a temperature of approximately 400° C.

In a case of methane atmosphere, a temperature at which the electrical resistance value of the sensing section 53 shows a local minimum value is approximately 400° C. For this reason, as shown in FIG. 4, in the case of the methane atmosphere being the detection target gas, in a relation between the heating period of time when the heater layer 30 is energized and the electrical resistance value of the sensing section 53, because the temperature of the sensing section 53 is close to 400° C. as the time is elapsed, the electrical resistance value gradually decreases and is close to a predetermined value, and a stabilized locus is drawn. On the other hand, in a case of the non-detection target gas, a temperature at which the electrical resistance value of the sensing section 53 shows the local minimum value is lower than 400° C. For this reason, in the non-detection target gas atmosphere, as described below, in the relation between the energizing period of time when the heater layer 30 is energized and the electrical resistance value, a locus is drawn showing that the electrical resistance value gradually decreases as the time is elapsed and turns to gently increase through a predetermined local minimum value. For example, the electrical resistance value of the sensing section 53 decreases accompanied with an increase of the heating period of time that is within a range between 0 milliseconds and 40 milliseconds, inclusive, after starting the heating. The electrical resistance of the sensing section 53 increases accompanied with an increase of the heating period of time that is within a range between 40 milliseconds and 500 milliseconds, inclusive, after starting the heating. In one example, the electrical resistance value of the sensing section 53 has a local minimum value at any one of time points within a range between 20 milliseconds and 40 milliseconds, inclusive, after starting the heating.

Particularly, the electrical resistance value of the sensing section 53 in high-concentration alcohol atmosphere falls below the electrical resistance value of the sensing section 53 in the methane atmosphere being the detection target gas during a predetermined period of time after starting the heating. However, in the example shown in FIG. 4, by extending the heating period of time being the energizing period of time during which the heater layer 30 is pulse-driven, the electrical resistance value of the sensing section 53 in the non-detection target gas atmosphere can be increased. On the other hand, in a case of the detection target gas atmosphere, even if the heating period of time is extended, the electrical resistance value of the sensing section 53 does not increase so much. In this way, there is a difference in change of the electrical characteristics corresponding to the time after starting the heating between the detection target gas atmosphere and the non-detection target gas atmosphere. Therefore, by extending the heating period of time, the detection target gas can be distinguished from the non-detection target gas and detected.

The higher the concentration of the non-detection target gas such as alcohol in the vicinity of the sensor is, the longer the heating period of time required for increasing the electrical resistance value of the sensing section 53 in the atmosphere such as alcohol is. Therefore, the heating period of time until the detection target gas (methane) can be distinguished from the volatile organic compound such as alcohol becomes long. According to the present gas sensor configuration, it was figured out that a combustion reaction at the selective combustion layer 54 is balanced with a diffusion limitation by the filter, and accordingly, the concentration of the volatile organic compound such as alcohol in the vicinity of the sensor is approximately 400 ppm at the maximum. Then, it was figured out that in a case where the concentration in the vicinity of the sensor is approximately 400 ppm at the maximum, if the heating period of time is 500 milliseconds, it is possible to distinguish the detection target gas (methane) from the volatile organic compound such as alcohol. Here, the filter may be an activated carbon adsorption layer provided to an opening of a cap that is provided with the gas sensor 100. The selective combustion layer 54 is a sensor catalyst layer provided to the gas sensor 100. The concentration in the vicinity of the sensor is a concentration in an internal space of the cap provided with the gas sensor 100.

Figure 5:
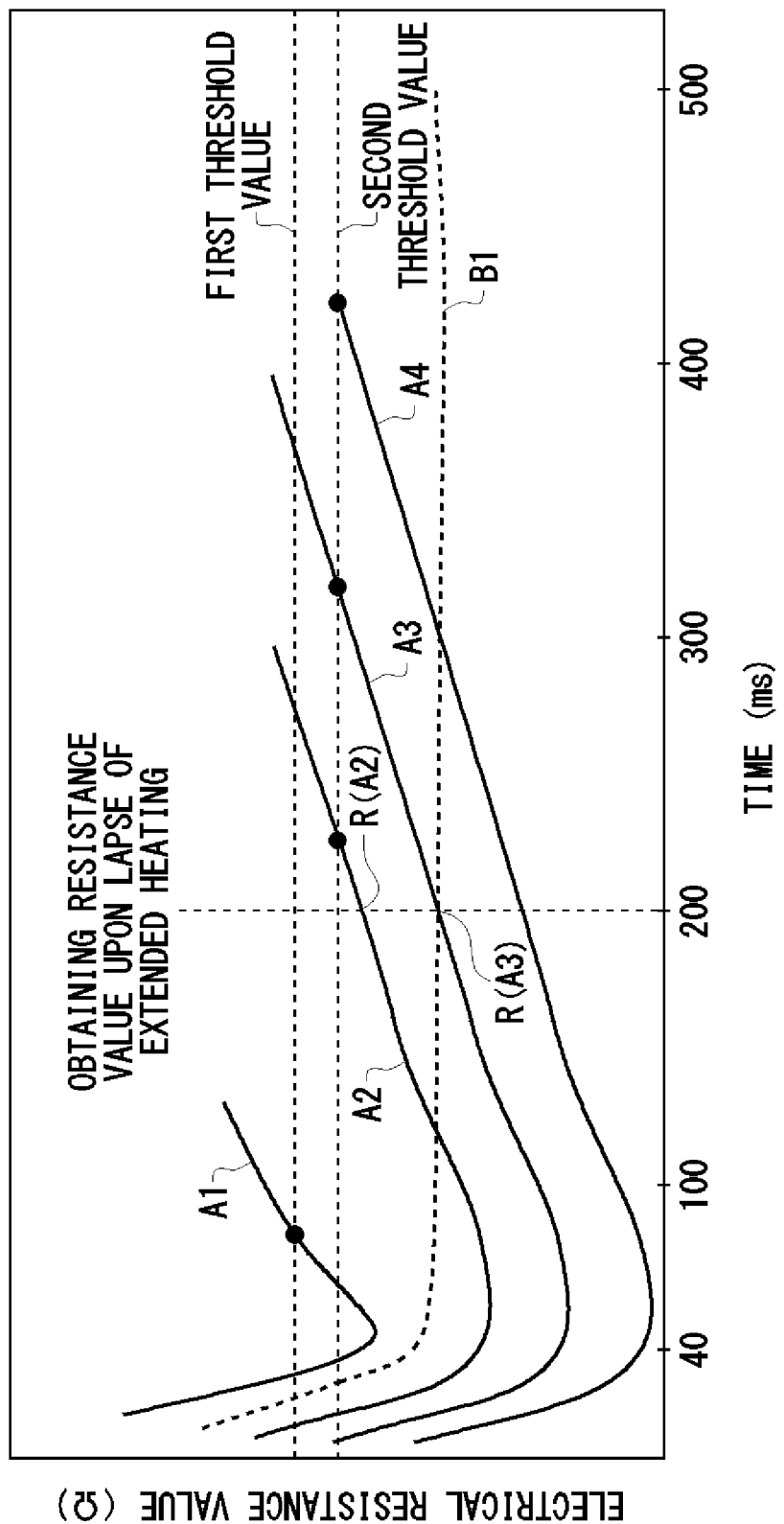
FIG. 5 shows relations respectively between the electrical resistance value of the sensor in the gas alarm device 1 of the first embodiment, and a first threshold value and a second threshold value.

FIG. 5 is a drawing showing a relation between the electrical resistance value of a sensor in the gas alarm device 1 of the first embodiment and the first threshold value and the second threshold value. The horizontal axis of FIG. 5 indicates the heating period of time being an energizing period of time during which the pulse-drive is performed. In the present example, an initial value of the heating period of time of the heater layer 30 is 100 milliseconds, the heating period of time is extended for the unit of 100 milliseconds, and the upper limit of the number of the extension times is set to four times.

In FIG. 5, four samples (A1, A2, A3, A4) of the characteristics of non-detection gas and one sample (B1) of the characteristics of the detection target gas are shown. The heating control section 4 drives the heater layer 30 with the pulse width of 100 milliseconds as a regular drive to heat the sensing section 53. The gas detection section 2 may obtain an electrical resistance value R100 of the sensing section 53 at a time point after 100 milliseconds elapsing from starting the heating, that is, a final time point of the pulse drive. However, not limited to this case, the gas detection section 2 may detect the electrical resistance value of the sensing section 53 at an arbitrarily determined time point after starting the heating as a comparison target to the first threshold value. The first determination section 6 determines whether the electrical resistance value R 100 is equal to or less than the first threshold value. The heating control section 4 extends the heating period of time of the heater layer 30 from 100 milliseconds to 200 milliseconds if the first determination section 6 determines that the electrical resistance value R 100 is equal to or less than the first threshold value.

In the example of FIG. 5, for the sample (A1), because the electrical resistance value R100 is larger than the first threshold value, the heating extension starting condition is not satisfied and accordingly, the heating period of time is not extended. On the other hand, for the samples (A2, A3, A4) and the sample (B1), because the electrical resistance value R100 is equal to or less than the first threshold value, which satisfies the heating extension starting condition, the heating period of time is extended from 200 milliseconds to 100 milliseconds.

If the first determination section 6 determines that the electrical resistance value R100 is equal to or less than the first threshold value, the heating control section 4 repeats the extension of the heating period of time and makes the second determination section 8 repeat the determination with a predetermined number of times as an upper limit as long as the second determination section 8 determines that the electrical resistance value upon lapse of the extension of the heating period of time is equal to or less than the second threshold value. The electrical resistance value upon lapse of the extension of the heating period of time may be an electrical resistance value R200 at the final time point of 200 milliseconds being the extended heating period of time, and may also be an electrical resistance value at any other time point.

In the example of FIG. 5, for the samples (A2, A3, A4 and B1), because the electrical resistance value upon lapse of the extended heating period of time that is extended from 100 milliseconds to 200 milliseconds, for example, the electrical resistance value R200 that is after 200 milliseconds after starting the heating is equal to or less than the second threshold value, the heating period of time is extended again by 100 milliseconds and the heating period of time is extended from 200 milliseconds to 300 milliseconds. For the sample (A2), the electrical resistance value of the sensing section 53 upon lapse of the extended heating period of time that is extended to 300 milliseconds, for example, an electrical resistance value R300 which is after 300 milliseconds after starting the heating is larger than the second threshold value. Therefore, it is determined that the reduction of the electrical resistance value of the sensing section 53 in the sample (A2) is merely a temporary influence caused by the non-target gas, and the heating period of time is not extended from 300 milliseconds to 400 milliseconds.

However, for example, with respect to the sample (A2), it is not necessarily needed to wait the time after 300 milliseconds after starting the heating to determine whether or not the electrical resistance value of the sensing section 53 is larger than the second threshold value. For example, for the sample (A2), whether or not the electrical resistance value of the sensing section 53 is larger than the second threshold value may be measured and determined in real time. In a case where it is determined, by the real-time measurement, that the electrical resistance value of the sensing section 53 is larger than the second threshold value, the heating can be immediately interrupted even in the middle of extending the heating period of time to 300 milliseconds. In the case shown in FIG. 5, for the sample (A2), according to the real-time measurement, the electrical resistance value of the sensing section 53 is larger than the second threshold value at a time point of 220 milliseconds after starting the heating. Therefore, the heating can be immediately interrupted at the time point of 220 milliseconds after starting the heating without continuing extending the heating to 300 milliseconds after starting the heating. Accordingly, power saving can be further achieved.

For the sample (A3), because it is determined that the electrical resistance value of the sensing section 53 upon lapse of the extended heating period of time that is extended to 300 milliseconds, for example, R400, is larger than the second threshold value, the heating control section 4 does not extend the heating period of time from 400 milliseconds to 500 milliseconds.

For the sample (A4) and the sample (B1), the heating period of time is extended from 100 milliseconds to 500 milliseconds through four times of the extension, the four times being the upper limit. Even after the extension of the heating period of time has been repeatedly performed for the upper-limit number of times, the second determination section 8 determines whether the electrical resistance value upon lapse of the extension of the heating period of time satisfy the heating repeating condition. In the present example, whether the electrical resistance value upon lapse of the extension of the heating period of time is equal to or less than the second threshold value is determined. Even after the extension of the heating period of time has been repeatedly performed for the upper-limit number of times, if the second determination section 8 determines that the electrical resistance value upon lapse of the extension of the heating period of time is equal to or less than the second threshold value, the gas detection section 2 determines that the detection target gas is detected. On the other hand, after repeating the extension of the heating period of time for the upper-limit number of times, if the electrical resistance value exceeds the second threshold value, the gas detection section 2 determines that this is an influence caused by the non-detection target gas.

In the present example, in the sample (A4), after repeating the extension of the heating period of time for the upper-limit number of times, because the electrical resistance value upon lapse of the extension of the heating period of time, for example, an electrical resistance value R500 after 500 milliseconds after starting the heating, is larger than the second threshold value, the gas detection section 2 determines that this is an influence caused by the non-detection target gas. On the other hand, in the sample (B1), after repeating the extension of the heating period of time for the upper-limit number of times, because the electrical resistance value upon lapse of the extension of the heating period of time, for example, the electrical resistance value R500 after 500 milliseconds after starting the heating, is equal to or less than the second threshold value, the gas detection section 2 determines that the detection target gas is detected.

Note that the temperature of the heater layer 30 changes depending on an applied voltage. In the present example, the determination by the first determination section 6 and the determination by the second determination section 8 are performed in a state in which the same voltage is applied to the heater layer 30. Therefore, compared to a case where the determination by the first determination section 6 and the determination by the second determination section 8 are performed at different temperatures, the temperature control can be simplified.

In the present example, the case where the initial value of the heating period of time was 100 milliseconds, the case where the heating period of time was extended for 100 milliseconds each time and the case where the upper limit of the number of extension times was four times were used; however, the gas alarm device 1 of the present example is not limited to these cases. Also, instead of the upper limit of the number of extension times, an upper limit of the drive time may also be used for control. Here, the upper limit of the drive time means an upper limit of a period of time obtained by adding a final extension time to the initial value of the heating period of time. Information about the initial value of the heating period of time, the extension time and the upper limit of the number of extension times or the upper limit of the drive time may be stored in advance in the storage section 10. In the present example, although a case where a fixed value is used as the second threshold value is described, the second threshold value in accordance with the number of the extension times may also be changed. In this case, the second threshold value is predetermined depending on the number of the extension times. Also, the electrical resistance value upon lapse of the extension of the heating period of time is obtained and the resistance value is compared to the second threshold value, if a difference between the resistance value and the second threshold value is large, the extension time is set longer than an immediately previous extension time, and if the difference therebetween is small, the extension time can also be set shorter than the immediately previous extension time. By arbitrarily setting the extension time, power consumption can be reduced. For example, in FIG. 5, in a case where the electrical resistance value R200 of the sample (A2) after 200 milliseconds after starting the heating is R (A2) and the electrical resistance value R200 of the sample (A3) after 200 milliseconds after starting the heating is R (A3), if the difference between R (A2) and the second threshold value is smaller than a predetermined value, the extension time can also be set to be shorter than the immediately previous extension time. If the difference between R (A3) and the second threshold value is larger than the predetermined value, the extension time can also be set to be longer than the immediately previous extension time.

Figure 6:
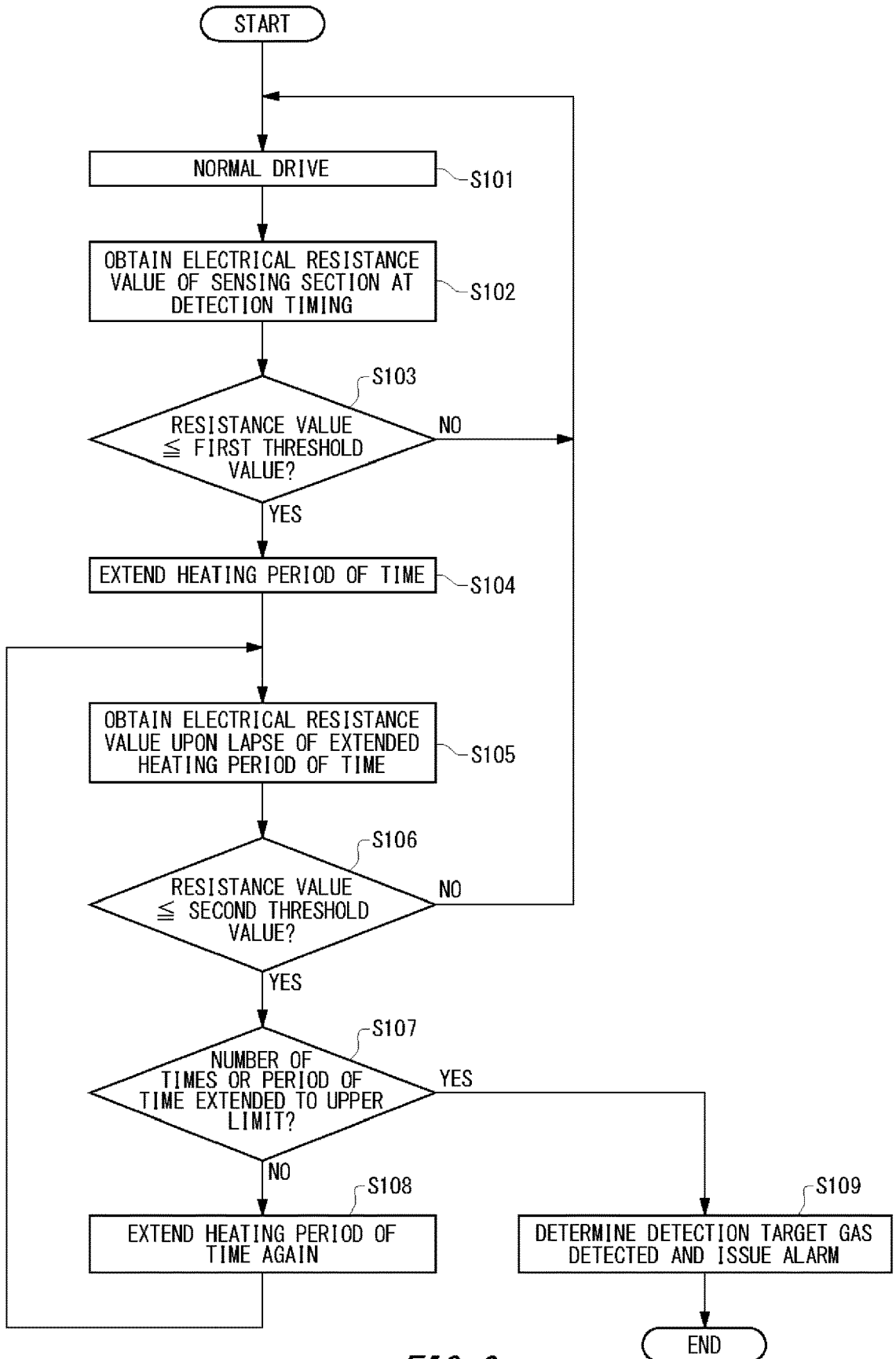
FIG. 6 shows a flow chart of one example of processing by the gas alarm device 1 of the first embodiment.

FIG. 6 is a flow chart showing one example of processing according to the gas alarm device 1 of the first embodiment. FIG. 6 describes a gas detection method using the gas alarm device 1 including the gas sensor 100 that includes the sensing section 53 having the electrical characteristics that change by the contact with the detection target gas, and the heater layer 30 that heats the sensing section 53.

The heating control section 4 normally drives the heater layer 30 (Step S101). For example, the heating control section 4 pulse-drives the heater layer 30 with the pulse width of 100 milliseconds in a cycle T of 45 seconds to cause the temperature of the heater layer 30 to fall within a high-temperature range being of equal to or greater than 400° C. and equal to or less than 500° C. The heating control section 4 suspends the driving of the heater layer 30 during the rest of the time (OFF). However, the normal drive is not limited to such a case of the High-Off manner. In a case where carbon monoxide is also to be detected, a High-Low-Off driving manner may be adopted, by which after the temperature of the heater layer 30 is set to be in the high-temperature range, the temperature of the heater layer 30 is lowered to be in a low-temperature range of approximately 100° C., and then the driving of the heater layer 30 is suspended. Also, a High-Off-Low-Off driving manner may also be adopted, by which after the temperature of the heater layer 30 is set to be in the high-temperature range, the driving of the heater layer 30 is suspended, and then, the temperature of the heater layer 30 is set to be in the low-temperature range, and after that, the driving of the heater layer 30 is suspended.

The gas detection section 2 obtains the electrical resistance value of the sensing section 53 of the gas sensor 100 at detection time (Step S102). For example, the gas detection section 2 obtains the electrical resistance value of the sensing section 53 at a final time point of the pulse drive. However, the detection time is not limited to this case and may be any time point. The first determination section 6 determines whether the obtained electrical resistance value is equal to or less than the first threshold value (Step S103). The processing of Step S103 is one example of the processing of determining whether or not the electrical characteristics of the sensing section 53 satisfy the heating extension starting condition. If it is determined that the obtained electrical resistance value is larger than the first threshold value (Step S103: NO), the heating period of time is not extended and the processing returns back to Step S101.

On the other hand, in a case where it is determined that the obtained electrical resistance value is equal to or less than the first threshold value (Step S103: YES), the case corresponds to a case where the first determination section 6 determines that the electrical characteristics satisfy the heating extension starting condition. Therefore, the heating control section 4 extends the heating period of time (Step S104). For example, the heating control section 4 further extends the heating period of time from the initial value being 100 milliseconds by 100 milliseconds and extends the heating period of time to 200 milliseconds. By setting in advance the first threshold value higher if compared to the alarm determination threshold value, although it cannot be said that the electrical characteristics of the sensing section 53 are equal to or less than the alarm determination threshold value, if a variation of the electrical characteristics occurs to some degree, the heating period of time can be extended to carefully perform the determination.

The gas detection section 2 obtains the electrical resistance value that is upon lapse of the extension of the heating period of time. For example, the gas detection section 2 obtains the electrical resistance value of the sensing section 53 at the final time point of the extended heating period of time (Step S105). However, the electrical resistance value upon lapse of the extension of the heating period of time is not limited to the electrical resistance value at the final time point of the extended heating period of time. The electrical resistance value of the sensing section 53 may also be obtained in real time within the extended heating period of time.

The second determination section 8 determines whether the electrical resistance value obtained in Step S105 is equal to or less than the second threshold value (Step S106). The processing of Step S106 is one example of the processing of determining whether or not the electrical characteristics of the sensing section 53 upon lapse of the extension of the heating period of time satisfy the heating repeating condition. If it is determined that the obtained electrical resistance value is larger than the second threshold value (Step S106: NO), the processing returns back to Step S101 without extending the heating period of time any more. Therefore, the processing of Step S106 is one example of the processing of determining, by the second determination section 8, whether or not the electrical characteristics of the sensing section 53 satisfy the heating stopping condition.

On the other hand, if it is determined that the obtained electrical resistance value is equal to or less than the second threshold value (Step S106: YES), the heating control section 4 refers to a history of the storage section 10 and determines whether the heating period of time has already been extended to the upper-limit number of times or the upper-limit drive time (Step S107). If the number of extension times of the heating period of time and the drive time do not reach the upper limits (Step S107: NO), the heating control section 4 further extends the heating period of time (Step S108). For example, the heating control section 4 further extends the heating period of time that has already been extended to 200 milliseconds by 100 milliseconds and sets the heating period of time to 300 milliseconds.

The processing from Step S103 to Step S108 corresponds to one example of the processing of extending the heating period of time of the heater layer 30 if it is determined that the electrical characteristics satisfy the heating extension starting condition, and of repeating the extension of the heating period of time and the determination of whether or not the electrical characteristics satisfy the heating repeating condition with the predetermined number of time as the upper limit as long as the electrical characteristics satisfy the heating repeating condition. Also, the processing from Step S103 to Step S108 corresponds to one example of processing of extending the heating period of time of the heater layer 30 if it is determined that the electrical characteristics satisfy the heating extension starting condition, and of continuing the extension of the heating period of time until it is determined that the electrical characteristics upon lapse of the extension of the heating period of time satisfy the heating stopping condition (Step S106: NO).

If the number of extension times of the heating period and the drive time has already been reaching the upper-limit number of times or the upper-limit time (Step S107: YES), the gas detection section 2 determines that the detection target gas is detected (Step S109). The alarm control section 14 sends a control signal to the alarm generation section 500. The alarm generation section 500 that has received the control signal issues the alarm (Step S109).

The processing of Step S107 and Step S109 corresponds to one example of the processing of determining that the detection target gas is detected if it is determined that the electrical characteristics satisfy the heating repeating condition even after the extension of the heating period of time has been repeatedly performed for the upper-limit number of times or the upper-limit drive time. Also, the processing of Step S107 and Step S109 corresponds to one example of the processing of determining, by the gas detection section 2, that the detection target gas is detected if it is determined that the electrical characteristics upon lapse of the predetermined extension time do not satisfy the heating stopping condition.

According to the present example, because the heating control section 4 extends the heating period of time if necessary, the heating control section 4 can distinguish the detection target gas from the non-detection target gas and detect the detection target gas. Accordingly, in spite of the absence of the detection target gas, an alarm is prevented from being issued beforehand.

According to the present example, the heating control section 4 not only determines whether or not to extend the heating period of time in accordance with a situation but also changes the number of extension times in accordance with the situation without extending the heating period of time to a uniform length even if extending the heating period of time. Therefore, comparing to a case where the heating period of time is uniformly extended long, power consumption can be reduced.

As described above, in the gas alarm device 1 of the first embodiment, a case where the predetermined first threshold value is used as the heating extension starting condition and the predetermined second threshold value is used as the heating repeating condition is described. Also, a case where the extension of the heating period of time is repeatedly performed using a predetermined time unit (for example, 100 milliseconds) as the extension time by which the heating period of time is extended is described. However, the present invention is not limited to this case.

Figure 7:
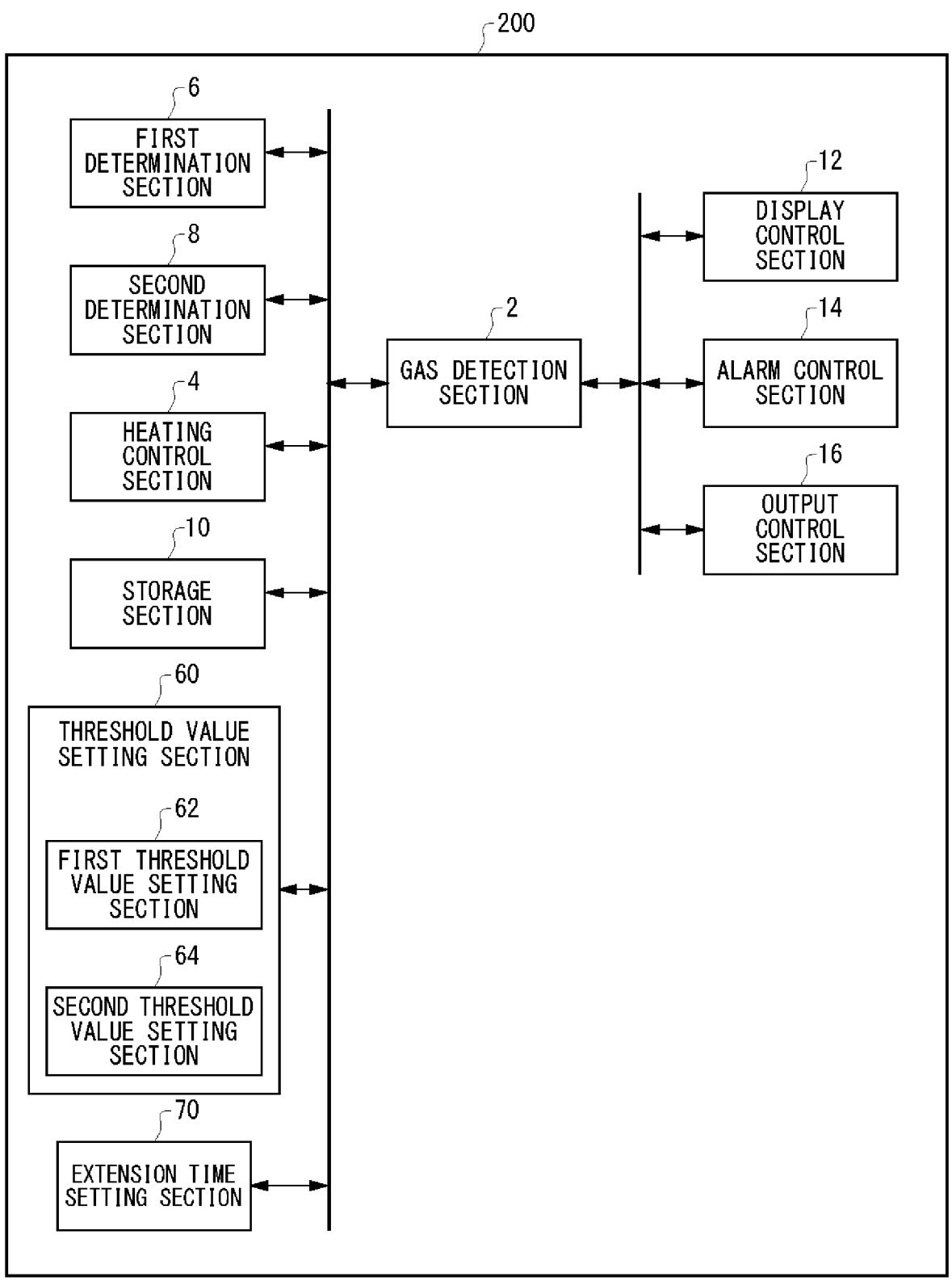
FIG. 7 shows a schematic diagram of the control section 200 in the gas alarm device 1 of a second embodiment of the present invention.

FIG. 7 is a schematic diagram of a control section 200 in the gas alarm device 1 of a second embodiment of the present invention. The gas alarm device 1 of the present example includes a threshold value setting section 60 and an extension time setting section 70 as functions of the control section 200. The other structures are similar to those in the case of the gas alarm device 1 of the first embodiment. Note that in the example of FIG. 7, although a case where the gas alarm device 1 includes both of the threshold value setting section 60 and the extension time setting section 70 is shown, the gas alarm device 1 is not limited to this case. The gas alarm device 1 may include either the threshold value setting section 60 or the extension time setting section 70.

The threshold value setting section 60 may set the threshold value according to a change rate of the electrical characteristics of the sensing section 53 after starting to heat the sensing section 53 by the heater layer 30. Alternatively, the threshold value setting section 60 may set the threshold value according to the electrical characteristics of the sensing section 53 at two or more time points. The present example includes the first threshold value setting section 62 and the second threshold value setting section 64 in order to set both of the first threshold value and the second threshold value. The first threshold value setting section 62 may set the first threshold value according to the change rate of the electrical characteristics of the sensing section 53 after starting the heating. Alternatively, the first threshold value setting section 62 may set the first threshold value according to the electrical characteristics of the sensing section 53 at two or more time points. On the other hand, the second threshold value setting section 64 may set the second threshold value according to the change rate of the electrical characteristics of the sensing section 53 after starting the heating. Alternatively, the second threshold value setting section 64 sets the second threshold value according to the electrical characteristics of the sensing section 53 at two or more time points. However, the threshold value setting section 60 is not limited to this case and may also set at least one of the first threshold value and the second threshold value.

The extension time setting section 70 may set the extension time by which the heating period of time is extended according to the change rate of the electrical characteristics of the sensing section 53 after starting to heat the sensing section 53 by the heater layer 30. The extension time setting section 70 may set the extension time by which the heating period of time is extended according to the electrical characteristics of the sensing section 53 at two or more time points.

Figure 8:
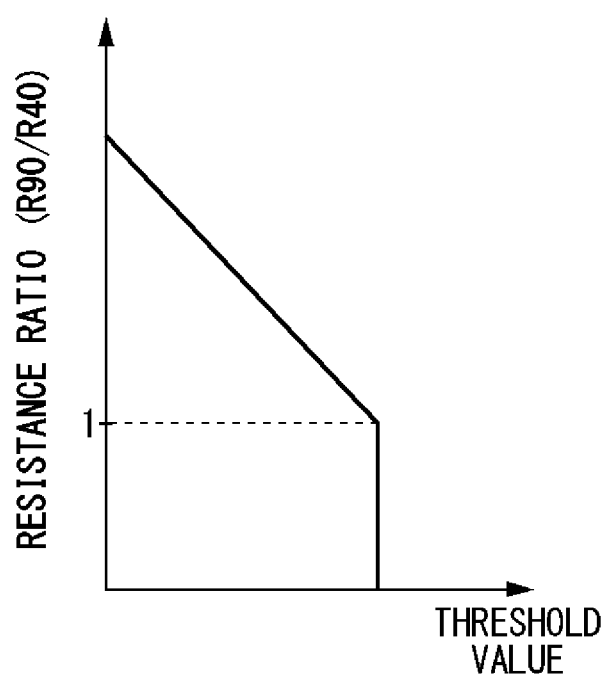
FIG. 8 shows one example of a relation between a resistance ratio and a set threshold value.

FIG. 8 is a drawing showing one example of a relation between a resistance ratio and the set threshold value. The threshold value setting section 60 calculates a ratio of the electrical resistance values of the sensing section 53 at two or more time points after starting to heat the sensing section 53 by the heater layer 30. Particularly, the threshold value setting section 60 may calculate the ratio of the electrical resistance value of the sensing section 53 at a time point indicating that the electrical resistance value of the sensing section 53 in the atmosphere of the non-detection target gas is the local minimum value to the electrical resistance value of the sensing section 53 at a time point later than that.

In the present example, the electrical resistance value of the sensing section 53 after 40 milliseconds after starting the heating indicates the local minimum value. The threshold value setting section 60 may set at least one threshold value of the first threshold value and the second threshold value according to a ratio of an electrical resistance value R40 of the sensing section 53 after 40 milliseconds after starting the heating to an electrical resistance value R90 of the sensing section 53 after 90 milliseconds after starting the heating. However, a threshold value corresponding to R200/R40 being a ratio of the electrical resistance value R40 of the sensing section 53 at a timing after 40 milliseconds after starting the heating to the electrical resistance value R200 of the sensing section 53 at a timing after 200 milliseconds after starting the heating may also be calculated, or other electrical resistance ratios may also be calculated. Also, instead of using the ratio of the electrical characteristics of the sensing section 53 at two or more time points after starting the heating, at least one threshold value of the first threshold value and the second threshold value may be set according to the change rate of the electrical characteristics of the sensing section 53 after starting to heat the sensing section 53 by the heater layer 30.

In the present example, in a case where a resistance ratio obtained by dividing R90 by R40 falls within a predetermined range that is equal to or less than 1, the threshold value may be fixed. In a case where the resistance ratio exceeds 1, the threshold value may be set to be low as the resistance ratio becomes high. A case where the resistance ratio obtained by dividing R90 by R40 is remarkably high if compared to 1 corresponds to a case where a drop of the electrical resistance value of the sensing section 53 near the local minimum value is large if compared to a case of the detection target gas atmosphere. In this case, because it is considered that there is the influence caused by the non-target gas, the threshold value is set to be low. Particularly, by setting the second threshold value low, the heating period of time can be prevented from being extended unnecessarily.

Figure 9:
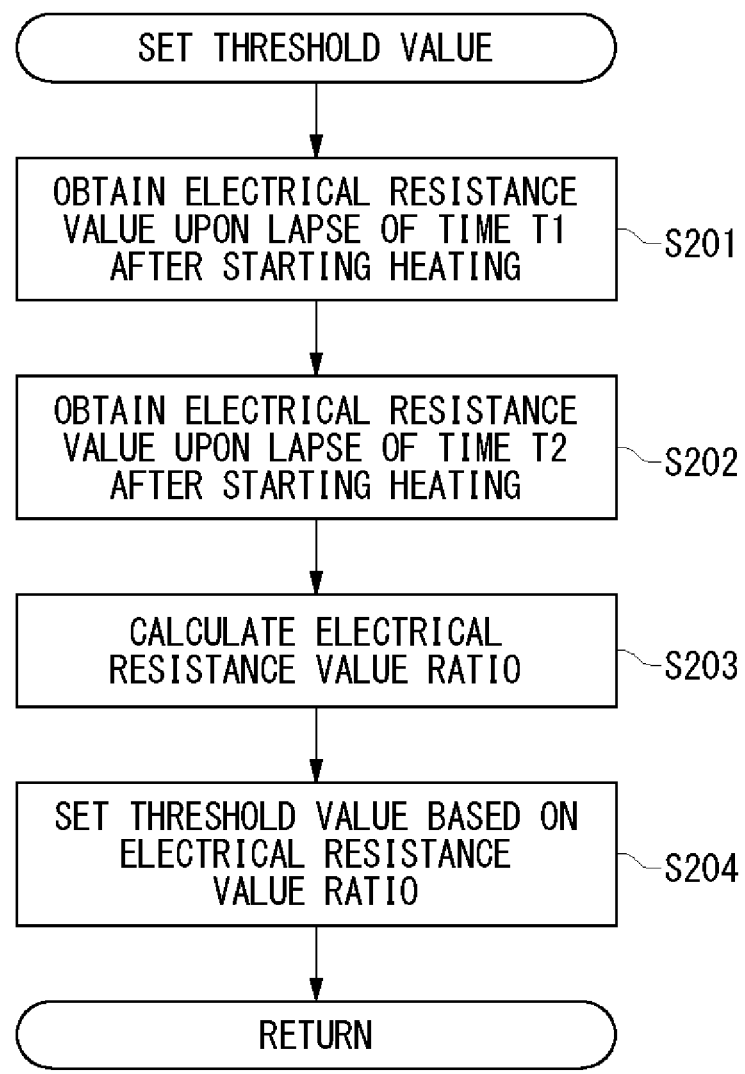
FIG. 9 shows a flow chart showing one example of a threshold value setting process by the gas alarm device 1 of the second embodiment.

FIG. 9 is a flow chart showing one example of threshold value setting process according to the gas alarm device 1 of the second embodiment. The gas detection section 2 obtains the electrical resistance value of the sensing section 53 upon lapse of the time T1 after starting the heating (Step S201). The lapse of the time T1 after starting the heating may be, as described above, about 40 milliseconds after starting the heating. Furthermore, the gas detection section 2 obtains the electrical resistance value of the sensing section 53 upon lapse of the time T2 after starting the heating (Step S202).

The threshold value setting section 60 calculates the electrical resistance ratio (for example, R90/R40) of the electrical resistance value of the sensing section 53 upon lapse of the time T1 after starting the heating to the electrical resistance value of the sensing section 53 upon lapse of the time T2 after starting the heating (Step S203). The threshold value setting section 60 sets at least one threshold value of the first threshold value and the second threshold value according to the calculated electrical resistance ratio (Step S204). Table information or an expression showing a relation between the electrical resistance ratio and the threshold values (the first threshold value and the second threshold value) may be stored in the storage section 10. In this case, the threshold value setting section 60 may set the first threshold value corresponding to the electrical resistance ratio while referring to the table information or the expression stored in the storage section 10.

Figure 10:
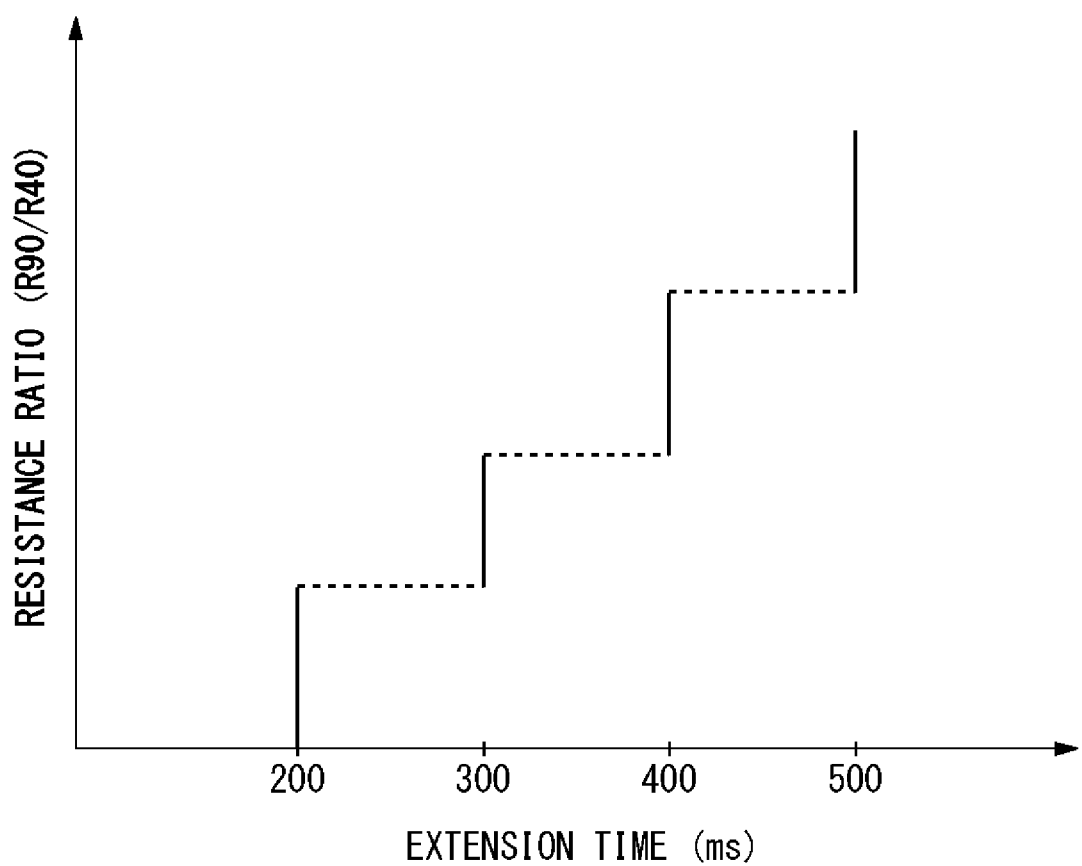
FIG. 10 shows one example of a relation between the resistance ratio and a set extension time.

FIG. 10 is a drawing showing one example of a relation between the resistance ratio and the set extension time. The extension time setting section 70 calculates the ratio of the electrical resistance values of the sensing section 53 at two or more time points after starting to heat the sensing section 53 by the heater layer 30. Particularly, the extension time setting section 70 may calculate a ratio of the electrical resistance value of the sensing section 53 at a time point indicating that the electrical resistance value of the sensing section 53 in the atmosphere of the non-detection target gas is the local minimum value to the electrical resistance value of the sensing section 53 at a time point later than that.

In the example shown in FIG. 10, in accordance with the value of the resistance ratio (for example, R90/R40), the extension time is set from among a plurality of candidates that are 200 milliseconds, 300 milliseconds, 400 milliseconds and 500 milliseconds. The extension time is set to become long according to the increase of the resistance ratio (for example, R90/R40). A case where the resistance ratio obtained by dividing R90 by R40 is remarkably high if compared to 1 corresponds to a case where the drop of the electrical resistance value of the sensing section 53 near the local minimum value is large if compared to a case of the detection target gas atmosphere. In this case, because it is considered that there is the influence caused by the non-target gas, the extension time is set long. On the other hand, if the resistance ratio is low, because it is considered that the influence caused by the non-target gas is small, the extension time is reduced to be short, thereby reducing the power consumption. Also, instead of using the ratio of the electrical characteristics of the sensing section 53 at two or more time points after starting the heating of the extension time may also be set according to the change rate of the electrical characteristics of the sensing section 53 after starting to heat the sensing section 53 by the heater layer 30.

Figure 11:
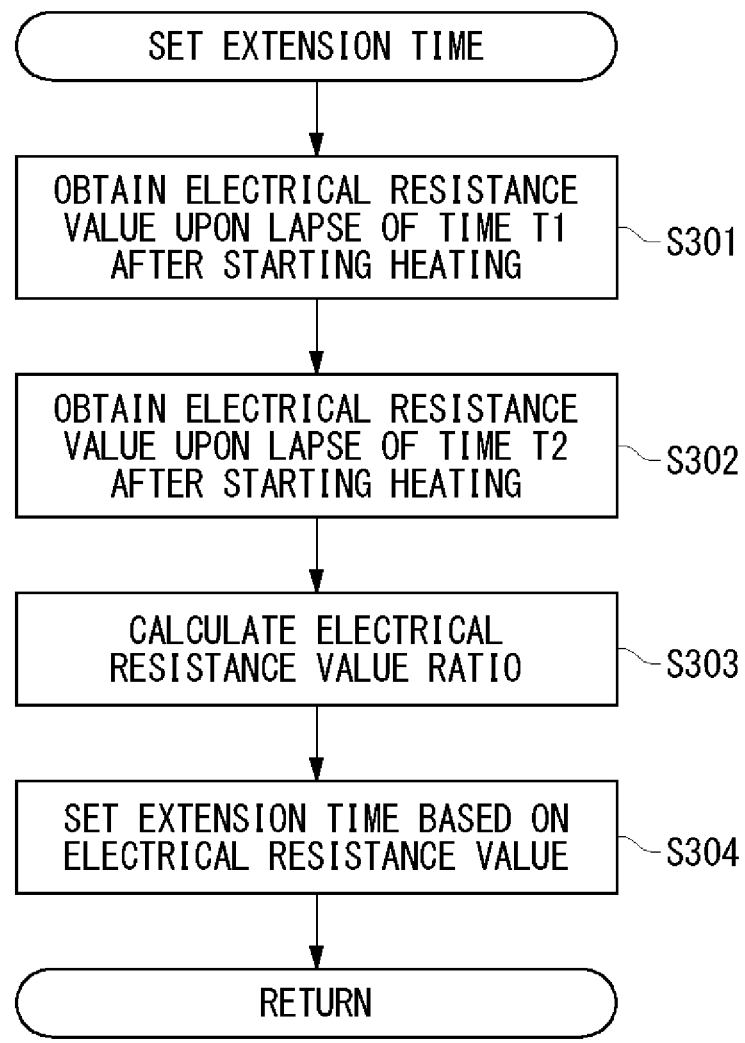
FIG. 11 shows one example of an extension time setting process by the gas alarm device 1 of the second embodiment.

FIG. 11 is a drawing showing one example of the extension time setting process according to the gas alarm device 1 of the second embodiment. The processing from Step S301 to Step S303 is similar to the processing from Step S201 to Step S203 in FIG. 9. Therefore, the repetitive description is omitted. The extension time setting section 70 sets the extension time according to the calculated electrical resistance ratio (Step S304). The table information or expression showing the relation between the electrical resistance ratio and the extension time may be stored in the storage section 10. In this case, the extension time setting section 70 sets the extension time corresponding to the electrical resistance ratio while referring to the table information or expression stored in the storage section 10.

If the first determination section 6 determines that the electrical characteristics satisfy the heating extension starting condition, the extension may be performed by the extension time set in Step S304. For example, if it is determined that the electrical resistance value is equal to or less than the first threshold value, the extension is performed by the extension time set in Step S304. Similarly, as long as the second determination section 8 determines that the electrical characteristics upon lapse of the extension of the heating period of time satisfy the heating repeating condition, the extension may be performed by the extension time that is set in Step S304 even if the heating period of time is extended with the predetermined number of times as the upper limit. The upper limit of the number of extension times may be changed depending on the length of the extension time. In a case were the extension time per time is set short, the upper limit of the number of extension times may be set large, and in a case where the extension time per time is set long, the upper limit of the number of extension times may be set small.

Figure 12:
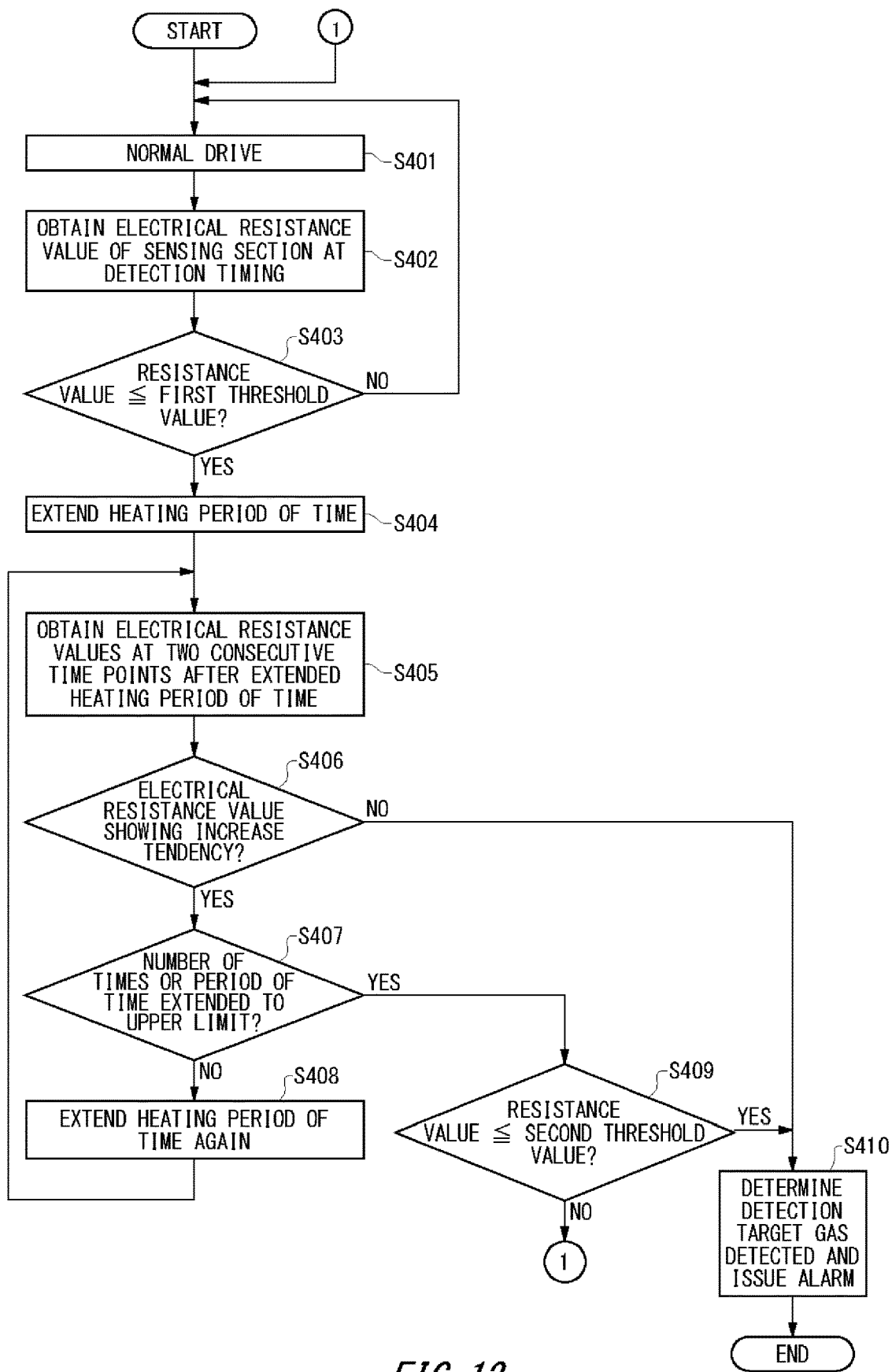
FIG. 12 shows a flow chart showing one example of processing according to the gas alarm device 1 of a third embodiment.
Figure 13:
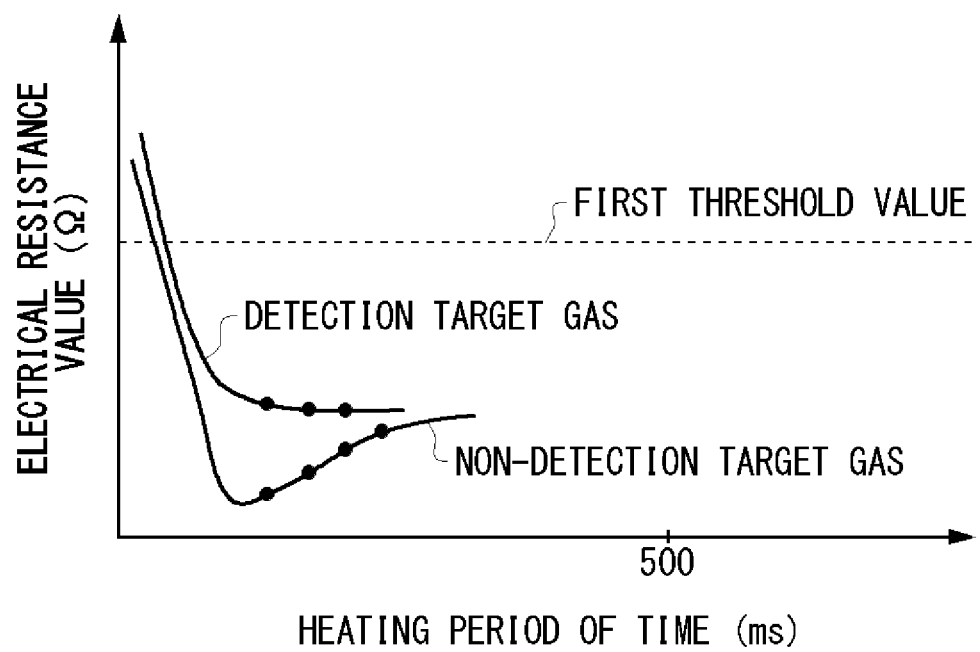
FIG. 13 describes processing in the third embodiment.

FIG. 12 is a flow chart showing one example of the processing according to the gas alarm device 1 of a third embodiment. FIG. 13 is a drawing describing the processing in the third embodiment. In the gas alarm device 1 in the above-described first embodiment and second embodiment, the cases where the heating extension starting condition and the heating repeating condition are respectively given as comparison relations with the threshold value is described. However, the present invention is not limited to these cases. For example, while the heating extension starting condition is given as the comparison relation with the first threshold value, the heating repeating condition may also be prescribed in accordance with whether or not the electrical resistance value of the sensing section 53 shows an increase tendency, not as the comparison relation with the threshold value.

In FIG. 12, the processing from Step S401 to Step S404 is similar to the processing from Step S101 to Step S104 in the first embodiment in FIG. 6. The gas detection section 2 obtains the electrical resistance values of the sensing section 53 at two consecutive time points after lapse of the extension of the heating period of time (Step S405). The second determination section 8 determines whether the electrical resistance values at the two consecutive time points obtained in Step S405 show the increase tendency (Step S406). As the two consecutive time points, the electrical resistance values of the sensing section 53 before extending the heating period of time may also be compared to the electrical resistance value of the sensing section 53 upon lapse of the extension of the heating period of time of the present time. The processing in Step S406 is one example of the processing of determining, by the second determination section 8, whether or not the electrical characteristics upon lapse of the extension of the heating period of time satisfy the heating repeating condition.

For example, if the initial value of the heating period of time is 100 milliseconds and the heating period of time is extended from 100 milliseconds to 200 milliseconds in Step S404, the electrical resistance value R100 of the sensing section 53 after 100 milliseconds after starting the heating and the electrical resistance value R200 of the sensing section 53 after 200 milliseconds after starting the heating are taken as the electrical resistance values at the two consecutive time points. However, the processing of the present example is not limited to this case, and may be a processing that can determine whether or not the electrical resistance values of the sensing section 53 show the increase tendency according to the increase of the heating period of time.

If the second determination section 8 determines that the electrical resistance values at the consecutive two time points do not show the increase tendency (Step S406: NO), the heating period of time is not extended any more. Therefore, the processing of Step S406 is one example of the processing of determining, by the second determination section 8, whether or not the electrical characteristics of the sensing section 53 satisfy the heating stopping condition. If the electrical resistance values at the two consecutive time points do not show the increase tendency but show a decrease tendency or a constancy, the gas detection section 2 may determine that the detection target gas is detected (Step S410). Note that if it is not determined that the electrical resistance values at the two consecutive time points show the increase tendency but only show the decrease tendency or the constancy, and further, the electrical resistance values are equal to or less than a predetermined threshold value for alarm determination, the gas detection section 2 may also determine that the detection target gas is detected. The alarm control section 14 sends a control signal to the alarm generation section 500. The alarm generation section 500 receiving the control signal issues an alarm (Step S409).

On the other hand, if the second determination section 8 determines the electrical resistance values at the two consecutive time points show the increase tendency (Step S406: YES), the heating control section 4 refers to a history of the storage section 10 and determines whether the extension has already been performed for the upper-limit number of times (Step S407). If the number of extension times of the heating period of time or the drive time does not reach the upper limit (Step S407: NO), the heating control section 4 further extends the heating period of time (Step S408). The heating control section 4 may further extend the heating period of time that has already been extended to 200 milliseconds for 100 milliseconds and may set the heating period of time to 300 milliseconds.

If the number of extension times of the heating period has already reached the upper-limit number of times (Step S407: YES), further, the second determination section 8 determines whether the last obtained electrical resistance value upon lapse of the extension of the heating period of time in Step S405 is equal to or less than the second threshold value (Step S409). If it is determined that the last obtained electrical resistance value upon lapse of the extension of the heating period of time is larger than the second threshold value (Step S409: NO), the heating period of time is not extended any more, and the processing returns back to Step S401. On the other hand, if it is determined that the last obtained electrical resistance value upon lapse of the extension of the heating period of time is equal to or less than the second threshold value (Step S409: YES), the gas detection section 2 may determine that the detection target gas is detected (Step S410). As described above, the processing from Step S405 to Step S408 is one example of the processing in which the heating control section 4 continues the extension of the heating period of time with a predetermined number of extension times or a predetermined drive time as the upper limit as long as the second determination section 8 determines that the electrical resistance values at the two consecutive time points after lapse of the extension of the heating period of time show the increase tendency. Also, the processing of step S409 is one example of the processing in which if the second determination section 8 determines that the electrical resistance value at the two consecutive time points after lapse of the extension of the heating period of time show the increase tendency, the second determination section 8 further determines whether the last obtained electrical resistance value upon lapse of the extension of the heating period of time is equal to or less than the second threshold value even after the extension of the heating period of time has been continued for the upper-limit number of extension times or the upper-limit drive time. The processing of Step S410 is one example of the processing in which the gas detection section determines that the detection target gas is detected if it is determined that the last obtained electrical resistance value is equal to or less than the second threshold value.

Figure 14:
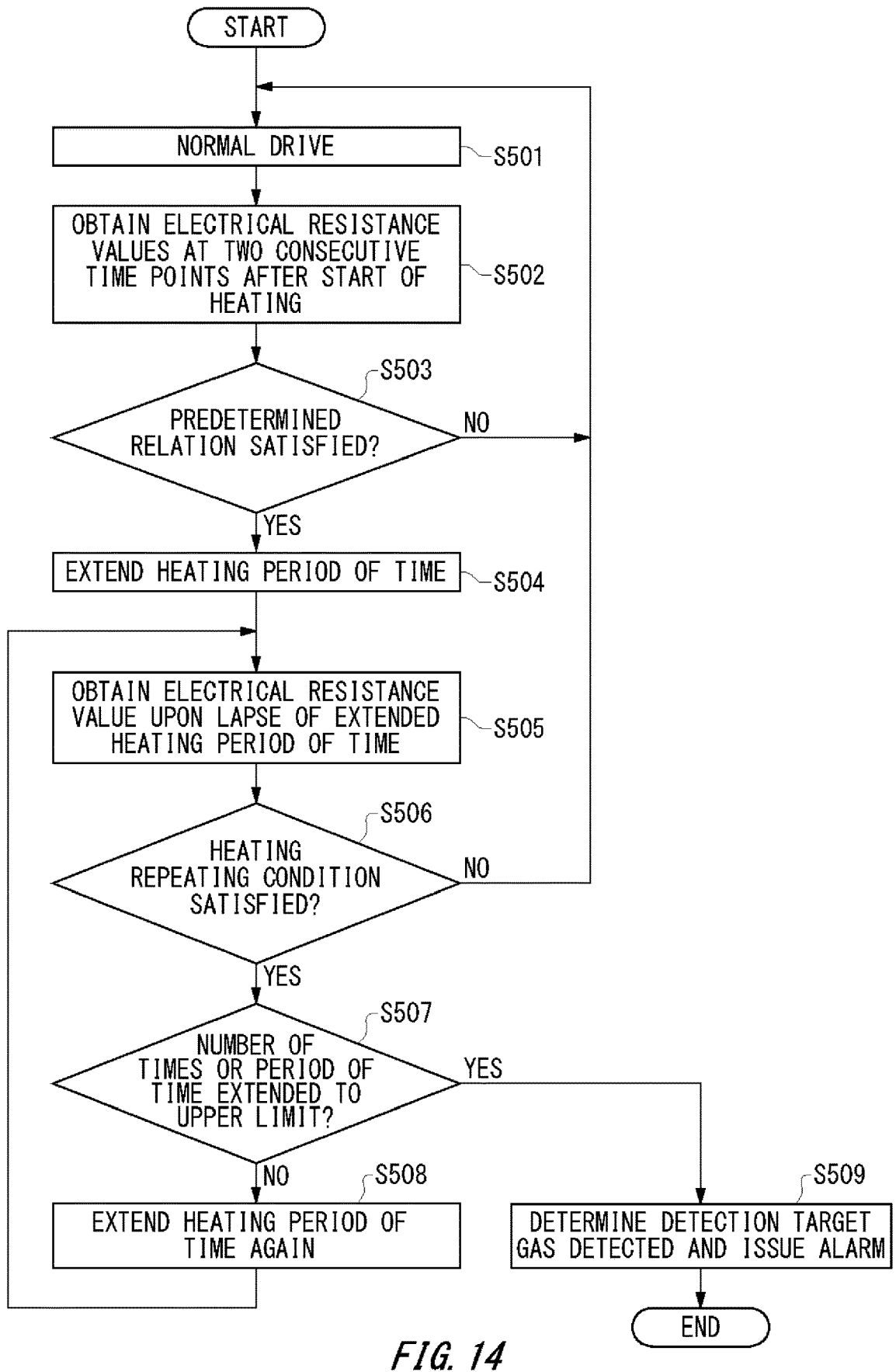
FIG. 14 shows a flow chart showing one example of processing by the gas alarm device 1 of a fourth embodiment.

FIG. 14 is a flow chart showing one example of the processing according to the gas alarm device 1 of a fourth embodiment. The processing of Step S501 is similar to the processing of Step S101 of FIG. 6. The gas detection section 2 obtains the electrical resistance values of the sensing section 53 at two or more time points after starting to heat the sensing section 53 by the heater layer 30 (Step S502). The electrical resistance value is one example of the electrical characteristics. The first determination section 6 determines whether or not the electrical resistance values of the sensing section 53 obtained at two or more time points after starting to heat the sensing section 53 by the heater layer 30 satisfy a predetermined relation. For example, the first determination section 6 determines whether a ratio of the electrical resistance values obtained at two or more time points is equal to or greater than a predetermined value. The first determination section 6 determines whether or not the electrical resistance value R40 of the sensing section 53 after 40 milliseconds after starting the heating and electrical resistance value R90 of the sensing section 53 after 90 milliseconds after starting the heating satisfy the following relation: (R90/R40)>1. The processing of Step S503 is one example of the processing of determining whether or not the electrical characteristics of the sensing section 53 satisfy the heating extension starting condition.

If the electrical characteristics of the sensing section 53 obtained at two or more time points after starting the heating do not satisfy the predetermined relation (Step S503: NO), the heating control section 4 does not extend the heating period of time and the processing returns back to Step S501. On the other hand, the case where the electrical characteristics of the sensing section 53 obtained at two or more time points after starting the heating satisfy the predetermined relation (Step S503: YES) corresponds to the case where the first determination section 6 determines that the electrical characteristics satisfy the heating extension starting condition. Therefore, the heating control section 4 extends the heating period of time (Step S504). Note that the change rate of the electrical characteristics of the sensing section 53 after starting the heating may also be obtained instead of the electrical characteristics of the sensing section 53 obtained at two or more time points after starting the heating. In this case, instead of the ratio of the electrical resistance values obtained at two or more time points, the determination of whether or not the extension starting condition is satisfied may also be performed by comparing the change rate of the electrical characteristics to a predetermined value (Step S503).

The gas detection section 2 obtains the electrical resistance value that is upon lapse of the extension of the heating period of time. For example, the gas detection section 2 obtains the electrical resistance value of the sensing section 53 at a final time point of the extended heating period of time (Step S505). However, the electrical resistance value upon lapse of the extension of the heating period of time is not limited to the electrical resistance value at the final time point of the extended heating period of time.

The second determination section 8 determines whether or not one or more electrical resistance values obtained in Step S505 satisfy the heating repeating condition (Step S506). The heating repeating condition may also be given as the comparison relation with the second threshold value as shown in Step S106 of FIG. 6, and may also be prescribed by whether or not the electrical resistance value of the sensing section 53 shows the increase tendency. If it is determined that the electrical resistance value does not satisfy the heating repeating condition (Step S506: NO), the heating period of time is not extended any more, and the processing returns back to Step S501. Therefore, the processing of Step S506 is one example of the processing of determining, by the second determination section 8, whether or not the electrical characteristics of the sensing section 53 satisfy the heating stopping condition. In other words, the processing of Step S506 is one example of the processing of continuing the extension of the heating period of time with the predetermined number of extension times or the predetermined drive time as the upper limit as long as the second determination section 8 determines that the electrical characteristics upon lapse of the extension of the heating period of time satisfy the second condition.

On the other hand, if it is determined that the electrical resistance values satisfy the heating repeating condition (Step S506: YES), the processing proceeds to the processing from Step S507 to Step S509. Because the processing from Step S507 to Step S509 is similar to the processing from Step S107 to Step S109 in FIG. 6, the repetitive description is omitted.

Figure 15:
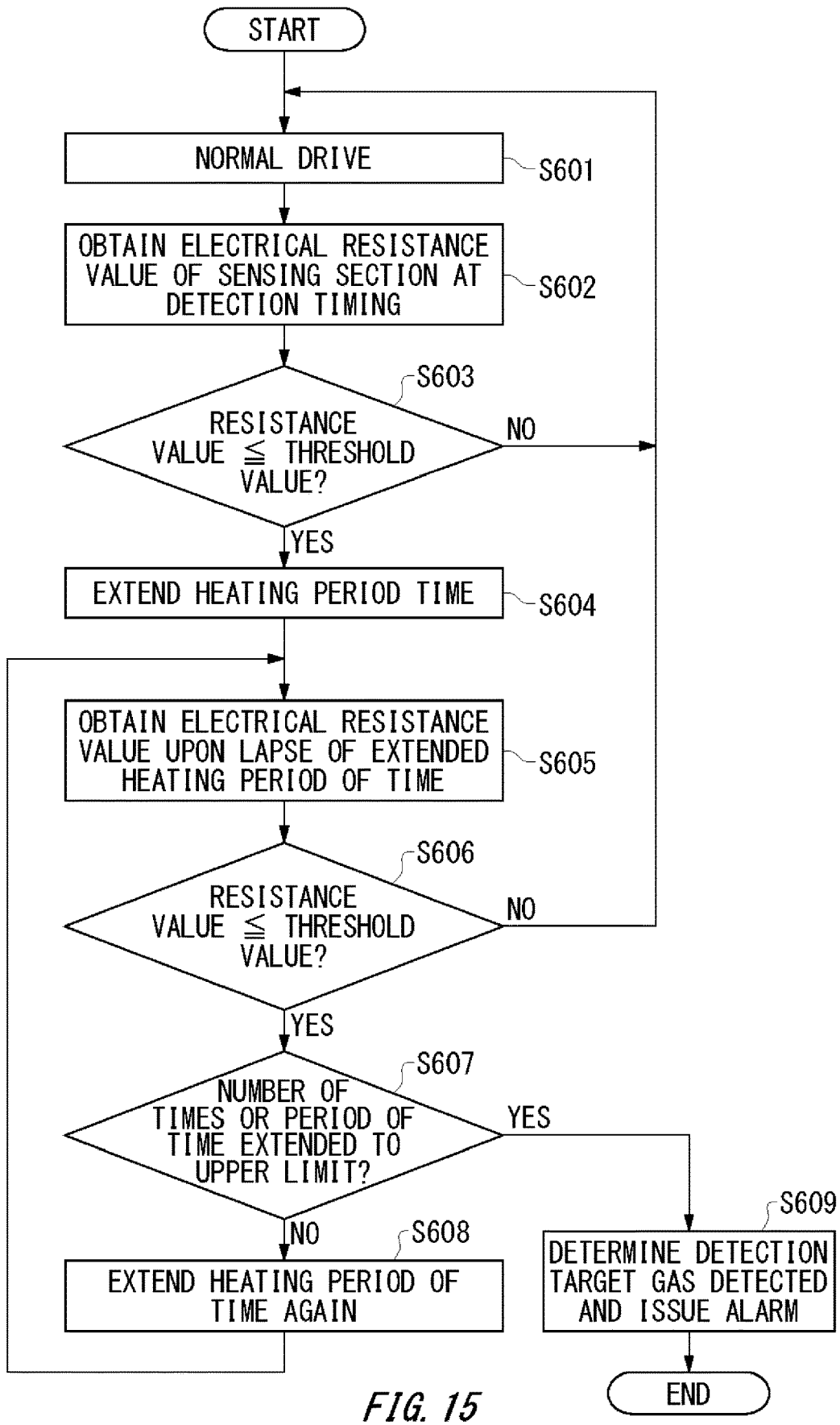
FIG. 15 shows a flow chart showing one example of processing by a gas alarm device 1 of a fifth embodiment.

FIG. 15 is a flow chart showing one example of the processing according to the gas alarm device 1 of a fifth embodiment. For the gas alarm device 1 according to the first to the fourth embodiments described using FIG. 1 to FIG. 14, the cases where the heating extension starting condition and the heating repeating condition are different conditions are described. However, the present invention is not limited to these cases. The heating extension starting condition and the heating repeating condition may be the same condition.

In Step S603 of FIG. 15, the first determination section 6 determines whether the obtained electrical resistance value is equal to or less than the threshold value (Step S603). The threshold value may also be predetermined and have been stored in the storage section 10. Also, as described using FIG. 8 and FIG. 9 as the second embodiment, the gas alarm device 1 of the present example may also include the threshold value setting section 60. In this case, the threshold value setting section 60 sets the threshold value according to the change rate of the electrical characteristics of the sensing section 53 after starting to heat the sensing section 53 by the heater layer 30 or according to the electrical characteristics of the sensing section 53 at two or more time points.

If it is determined that the obtained electrical resistance value is larger than the threshold value (Step S603: NO), the heating period of time is not extended any more, and the processing returns back to Step S601. On the other hand, the case where it is determined that the obtained electrical resistance value is equal to or less than the threshold value (Step S603: YES) corresponds to the case where the first determination section 6 determines that the electrical characteristics satisfy the heating extension starting condition. Therefore, the heating control section 4 extends the heating period of time (Step S604). The gas detection section 2 obtains the electrical resistance value that is upon lapse of the extension of the heating period of time (Step S605). The second determination section 8 determines whether the electrical resistance value obtained in Step S605 is equal to or less than the threshold value (Step S606). The threshold value used in Step S606 and the threshold value used in Step S603 are the same. If it is determined that the obtained electrical resistance value is larger than the threshold value (Step S606: NO), the heating period of time is not extended any more, and the processing returns back to Step S601. That is, if the second determination section 8 determines that the electrical resistance value upon lapse of the extension of the heating period of time exceeds the threshold value, the heating control section 4 stops the heating by the heater layer 30. Therefore, the processing of Step S606 is one example of the processing of determining, by the second determination section 8, whether or not the electrical characteristics of the sensing section 53 satisfy the heating stopping condition. On the other hand, if it is determined that the obtained electrical resistance value is equal to or less than the second threshold value (Step S606: YES), the processing from Step S607 to Step S609 is performed. The processing of Step S606 is one example of the processing of determining whether or not the electrical characteristics of the sensing section 53 upon lapse of the extension of the heating period of time satisfy the heating repeating condition.

The processing from Step S607 of Step S609 is similar to the processing from Step S107 to step S109 shown in FIG. 6. Therefore, the repetitive description is omitted. As shown in the present example, even if the heating extension starting condition and the heating repeating condition are the same condition, the power consumption can be reduced while the detection target gas can be distinguished from the non-detection target gas and be detected.

As described above, the present invention is described using the embodiments; however, each embodiment in the present specification can be appropriately combined with each other. The technical scope of the present invention is not limited to the scope according to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A gas alarm device, comprising:
a gas sensor that includes a sensing section having electrical characteristics that change by a contact with detection target gas, and a heater section that heats the sensing section;
a gas detection section that detects the detection target gas based on the electrical characteristics of the sensing section;
a heating control section that controls heating by the heater section;
a first determination section that determines whether or not the electrical characteristics of the sensing section satisfy a first condition; and
a second determination section that determines whether or not the electrical characteristics of the sensing section satisfy a second condition, wherein
the heating control section extends a heating period of time of the heater section if the first determination section determines that the electrical characteristics satisfy the first condition, and continues extending the heating period of time of the heater section in accordance with a determination result, by the second determination section, of whether or not the electrical characteristics upon lapse of extension of the heating period of time satisfy the second condition, and the gas detection section determines, according to the electrical characteristics upon lapse of extension time, that the detection target gas is detected.

2. The gas alarm device according to claim 1, wherein
the first condition is a heating extension starting condition,
the second condition is a heating stopping condition,
the first determination section determines whether or not the electrical characteristics of the sensing section satisfy the heating extension starting condition;
the second determination section determines whether or not the electrical characteristics of the sensing section satisfy the heating stopping condition, and
the heating control section extends the heating period of time of the heater section if the first determination section determines that the electrical characteristics satisfy the heating extension starting condition, and continues extending the heating period of time until the second determination section determines that the electrical characteristics upon lapse of extension of the heating period of time satisfy the heating stopping condition, and the gas detection section determines that the detection target gas is detected if it is determined that the electrical characteristics upon lapse of predetermined extension time do not satisfy the heating stopping condition.

3. alarm device according to claim 1, wherein
the first condition is a heating extension starting condition,
the second condition is a heating repeating condition,
the first determination section determines whether or not the electrical characteristics of the sensing section satisfy the heating extension starting condition,
the second determination section determines whether or not the electrical characteristics of the sensing section satisfy the heating repeating condition,
the heating control section extends a heating period of time of the heater section if the first determination section determines that the electrical characteristics satisfy the heating extension starting condition, and repeats extension of the heating period of time and makes the second determination section repeat a determination as long as the second determination section determines that the electrical characteristics upon lapse of extension of the heating period of time satisfy the heating repeating condition, and
the gas detection section determines that the detection target gas is detected if the second determination section determines that the electrical characteristics upon lapse of extension of the heating period of time satisfy the heating repeating condition.

4. The gas alarm device according to claim 3, wherein
as long as the second determination section determines that the electrical characteristics upon lapse of extension of the heating period of time satisfy the heating repeating condition, the heating control section repeats, with a predetermined number of times or a predetermined drive time as an upper limit, extension of the heating period of time and makes the second determination section repeat a determination.

5. The gas alarm device according to claim 1, wherein
a temperature of the heater section changes depending on a applied voltage, and
a determination by the first determination section and a determination by the second determination section are performed in a state in which an identical voltage is applied to the heater section.

6. The gas alarm device according to claim 3, wherein the heating extension starting condition and the heating repeating condition are an identical condition,
the electrical characteristics of the sensing section is an electrical resistance value of the sensing section,
the heating control section:
extends a heating period of time of the heater section if the first determination section determines that the electrical resistance value is equal to or less than a threshold value; and
repeats, with a predetermined number of times or a predetermined drive time as an upper limit, extension of the heating period of time and makes the second determination section repeat a determination as long as the second determination section determines that the electrical resistance value upon lapse of extension of the heating period of time is equal to or less than the threshold value, and
the gas detection section determines that the detection target gas is detected if the second determination section determines that the electrical resistance value upon lapse of extension of the heating period of time is equal to or less than the threshold value even after the extension of the heating period of time has been repeatedly performed for the upper-limit number of times or the upper-limit drive time.

7. alarm device according to claim 2, wherein
the electrical characteristics of the sensing section is an electrical resistance value of the sensing section, and
the heating control section stops the heating by the heater section if the second determination section determines that the electrical resistance value upon lapse of extension of the heating period of time exceeds a threshold value.

8. The gas alarm device according to claim 7, further comprising:
a threshold value setting section that sets the threshold value according to a change rate of the electrical characteristics of the sensing section after the heater section starts to heat the sensing section or according to the electrical characteristics of the sensing section at two or more time points.

9. The gas alarm device according to claim 3, wherein the heating extension starting condition and the heating repeating condition are different conditions.

10. The gas alarm device according to claim 9, wherein
the electrical characteristics of the sensing section is an electrical resistance value of the sensing section,
the heating control section extends a heating period of time of the heater section if the first determination section determines that the electrical resistance value is equal to or less than a first threshold value, and repeats, with a predetermined number of times or a predetermined drive time as an upper limit, extension of the heating period of time and makes the second determination section repeat a determination as long as the second determination section determines that the electrical resistance value upon lapse of extension of the heating period of time is equal to or less than a second threshold value lower than the first threshold value, and
the gas detection section determines that the detection target gas is detected if the second determination section determines that the electrical resistance value upon lapse of extension of the heating period of time is equal to or less than the second threshold value even after the extension of the heating period of time has been repeatedly performed for the upper-limit number of times or the upper-limit drive time.

11. The gas alarm device according to claim 2, wherein
the electrical characteristics of the sensing section is an electrical resistance value of the sensing section,
the heating control section extends a heating period of time of the heater section if the first determination section determines that the electrical resistance value is equal to or less than a first threshold value, and
the heating control section stops the heating by the heater section if the second determination section determines that the electrical resistance value upon lapse of extension of the heating period of time exceeds a second threshold value lower than the first threshold value.

12. The gas alarm device according to claim 11, further comprising:
a threshold value setting section that sets at least one of the first threshold value and the second threshold value according to a change rate of the electrical characteristics of the sensing section after the heater section starts to heat the sensing section or according to the electrical characteristics of the sensing section at two or more time points; or
an extension time setting section that sets extension time by which the heating period of time is extended according to a change rate of the electrical characteristics of the sensing section after starting to heat the sensing section by the heater section or according to the electrical characteristics of the sensing section at two or more time points.

13. The gas alarm device according to claim 1, wherein
the electrical characteristics of the sensing section is an electrical resistance value of the sensing section,
the heating control section extends a heating period of time of the heater section if the first determination section determines that the electrical resistance value is equal to or less than a first threshold value, and continues extending the heating period of time with a predetermined number of extension times or a predetermined drive time as an upper limit as long as the second determination section determines that the electrical resistance values at two consecutive time points after lapse of extension of the heating period of time show an increase tendency, and
if the second determination section determines that the electrical resistance values at two consecutive time points upon lapse of extension of the heating period of time show an increase tendency even after the extension of the heating period of time has been continued for the upper-limit number of extension times or the upper-limit drive time, the second determination section further determines whether a last obtained electrical resistance value upon lapse of extension of the heating period of time is equal to or less than a second threshold value, and if it is determined that the last obtained electrical resistance value is equal to or less than the second threshold value, the gas detection section determines that the detection target gas is detected.

14. The gas alarm device according to claim 1, wherein
the electrical characteristics of the sensing section is an electrical resistance value of the sensing section, and
the heating control section extends a heating period of time of the heater section if it is determined that a change rate of the electrical characteristics of the sensing section after the heater section starts to heat the sensing section, or electrical characteristics obtained at two or more time points satisfies/satisfy a predetermined relation, and continues extension of the heating period of time with a predetermined number of extension times or a predetermined drive time as an upper limit as long as the second determination section determines that the electrical characteristics upon lapse of extension of the heating period of time satisfy the second condition.

15. A gas detection method using a gas alarm device comprising a gas sensor that includes a sensing section having electrical characteristics that change by a contact with detection target gas, and a heater section that heats the sensing section, the gas detection method comprising:

extending a heating period of time of the heater section if the electrical characteristics are determined to satisfy a heating extension starting condition, and repeating extension of the heating period of time and a determination whether or not the electrical characteristics upon lapse of extension of the heating period of time satisfy a heating repeating condition as long as the electrical characteristics upon lapse of extension of the heating period of time satisfy a heating repeating condition; and determining that the detection target gas is detected if it is determined that the electrical characteristics upon lapse of extension of the heating period of time satisfy the heating repeating condition.

* * * * *